US00RE38026E

(19) United States
(12) Reissued Patent
Tada et al.

(10) Patent Number: US RE38,026 E
(45) Date of Reissued Patent: Mar. 11, 2003

(54) DEVELOPING DEVICE HAVING REGULATING ROTARY MEMBER FOR REGULATING TONER AMOUNT

(75) Inventors: Tatsuya Tada, Yokohama (JP); Isami Itoh, Kawasaki (JP)

(73) Assignee: Canon Kabushiki Kaisha, Tokyo (JP)

(21) Appl. No.: 09/963,853

(22) Filed: Sep. 27, 2001

Related U.S. Patent Documents

Reissue of:
(64) Patent No.: 5,781,836
Issued: Jul. 14, 1998
Appl. No.: 08/755,598
Filed: Nov. 25, 1996

U.S. Applications:
(63) Continuation of application No. 08/348,222, filed on Nov. 28, 1994, now abandoned.

(30) Foreign Application Priority Data

Nov. 29, 1993 (JP) ..... 5-323162
Nov. 29, 1993 (JP) ..... 5-323164
Dec. 16, 1993 (JP) ..... 5-342693

(51) Int. Cl.[7] ..... G03G 15/09
(52) U.S. Cl. ..... 399/275; 399/274
(58) Field of Search ..... 399/222, 252, 399/264, 265, 267, 272, 274, 275, 279, 284

(56) References Cited

U.S. PATENT DOCUMENTS

| | | | | |
|---|---|---|---|---|
| 2,221,776 | A | | 11/1940 | Carlson |
| 2,297,691 | A | | 10/1942 | Carlson |
| 2,874,063 | A | | 2/1959 | Greig |
| 3,909,258 | A | | 9/1975 | Kotz |
| 4,777,512 | A | | 10/1988 | Takahashi et al. |
| 4,985,823 | A | | 1/1991 | Tada et al. |
| 5,054,419 | A | * | 10/1991 | Itaya et al. |
| 5,065,693 | A | * | 11/1991 | Yoshino et al. |
| 5,143,017 | A | * | 9/1992 | Haneda et al. |
| 5,168,312 | A | * | 12/1992 | Aoto et al. |
| 5,168,318 | A | * | 12/1992 | Haneda et al. |
| 5,184,187 | A | * | 2/1993 | Haneda et al. |
| 5,196,888 | A | * | 3/1993 | Matsuda et al. |
| 5,229,825 | A | * | 7/1993 | Yousey et al. |
| 5,517,286 | A | | 5/1996 | Tada et al. |
| 5,523,533 | A | | 6/1996 | Itoh et al. |

FOREIGN PATENT DOCUMENTS

| | | |
|---|---|---|
| JP | 42-23910 | 11/1942 |
| JP | 43-24748 | 10/1943 |
| JP | 52-94140 | 8/1977 |
| JP | 54-43036 | 4/1979 |

* cited by examiner

*Primary Examiner*—Sandra Brase
(74) *Attorney, Agent, or Firm*—Fitzpatrick, Cella, Harper & Scinto

(57) ABSTRACT

A developing device for an image forming apparatus such as a copying machine, a printer, or the like to develop an electrostatic latent image on an image carrier includes a toner carrier which moves while carrying a toner on its surface, and a regulating member for regulating the amount of toner on the toner carrier by applying a moving force to the toner in a direction opposite to the moving direction of the toner carrier. In a regulating portion defined by the regulating member, a convey force received by a toner portion, which does not contact the surface of the toner carrier, from the regulating member is larger than a convey force received from the toner carrier.

4 Claims, 8 Drawing Sheets

DEVELOPING DEVICE HAVING REGULATING ROTARY MEMBER FOR REGULATING TONER AMOUNT

Matter enclosed in heavy brackets [ ] appears in the original patent but forms no part of this reissue specification; matter printed in italics indicates the additions made by reissue.

This application is a continuation of application Ser. No. 08/348,222 filed Nov. 28, 1994, now abandoned.

BACKGROUND OF THE INVENTION

1. Field of the Invention

The present invention relates to a developing device which is used in an image forming apparatus such as a copying machine, a printer, or the like, and which develops an electrostatic latent image on an image carrier.

2. Related Background Art

As conventional electrophotography methods, a large number of methods are known, as described in U.S. Pat. No. 2,297,691, Japanese Patent Publication Nos. 42-23910 and 43-24748, and the like. In general, an electrical latent image is formed on a photosensitive body consisting of a photoconductive material, by one of various means, a toner image is formed using a toner, the toner image is transferred onto a transfer medium such as a paper sheet, as needed, and the toner image transferred onto the transfer medium is fixed by heat, a vapor of a solvent, or the like, thus obtaining a copy. Also, various methods of visualizing an electrical latent image using a toner are known.

As developing methods, a large number of developing methods, for example, a magnetic brush developing method described in U.S. Pat. No. 2,874,063, a powder cloud method described in U.S. Pat. No. 2,221,776, a fur brush method, a liquid developing method, and the like, are known.

Of these developing methods, a magnetic brush method, a cascade method, a liquid developing method, and the like, which use a developing agent mainly consisting of a toner and a carrier, have widely been put into practice. These methods are excellent in that they can relatively stably obtain satisfactory images, but have common drawbacks associated with a two-component developing agent, i.e., degradation of the carrier and a variation in mixing ratio of the toner and carrier.

In order to avoid such drawbacks, various developing methods using a one-component developing agent consisting of only a toner have been proposed. For example, U.S. Pat. No. 3,909,258 proposes a method of developing an image using a magnetic toner having conductivity. In this method, a conductive magnetic toner is supported on a cylindrical conductive sleeve having a magnetism therein, and an electrostatic latent image is developed by bringing the sleeve into contact with the latent image. In this case, a conductive path is formed between the surface of a recording medium and the surface of the sleeve by toner particles on a developing region, an electric charge is guided from the sleeve to the toner particles via the conductive path, and the toner particles become attached to an image portion by a Coulomb force with the electrostatic latent image portion, thereby developing the image. The developing method using a conductive magnetic toner is an excellent method since it can avoid conventional problems associated with a two-component toner. However, since the toner is conductive, it is difficult to electrostatically transfer the developed image from the recording medium to a final support member such as a normal paper sheet.

In order to solve this problem, as a developing method using a high-resistance toner which can be electrostatically transferred, a developing method utilizing dielectric polarization of toner particles is described in Japanese Laid-Open Patent Application No. 52-94140. However, this method has drawbacks such as a low developing speed at which the developed image cannot have a sufficient density, and it is difficult to put this method into practical use. As another method using a high-resistance toner, a method of developing an image by triboelectrification, i.e., electrification of toner particles by friction between toner particles themselves or friction between toner particles and a sleeve, and bringing the charged toner particles into contact with an electrostatic holding member, is known. However, this method has the following drawbacks. That is, the number of times of contact between the toner particles and the friction member is small, and the toner particles are often insufficiently triboelectrified. In addition, when the Coulomb force between the charged toner particles and the sleeve is strong, the toner particles easily cohere. Thus, it is pointed out that many practical problems remain unsolved.

Japanese Laid-Open Patent Application No. 54-43036 proposes a novel developing method which can eliminate the above-mentioned drawbacks. In this method, a very thin toner layer is coated on a developing sleeve, is triboelectrified, and is brought very close to an electrostatic latent image under the influence of a magnetic field to face the image without contacting it, thereby developing the image.

According to this method, since a very thin layer of a magnetic toner is coated to increase the number of times of contact between the magnetic toner and the developing sleeve, a triboelectrification electric charge amount required for development can be developed in the toner.

However, even in the above-mentioned method, it is known that the number of times of contact between the developing sleeve and the magnetic toner is smaller than that between the toner and carrier in a two-component type developing agent.

Also, it is well known that the number of times of contact between the magnetic toner and the developing sleeve required for the magnetic toner to acquire a triboelectrification electric charge amount required for development varies depending on the composition of the magnetic toner, and the like.

Therefore, in the above-mentioned method, in a system which requires a larger number of times of contact to acquire a required triboelectrification electric charge amount, a phenomenon caused by charging instability tends to occur.

Furthermore, it is well known that the number of times of contact between the magnetic toner and the developing sleeve required for the magnetic toner to acquire a triboelectrification electric charge amount required for development varies depending on the composition of the magnetic toner, and the like.

Therefore, in the above-mentioned method, in a system which requires a larger number of times of contact to acquire a required triboelectrification electric charge amount, a phenomenon caused by charging instability tends to occur.

The present inventors examined electric charges generated by the one-component developing method, and found that the toner behaved as follows in an electric charge developed portion of the one-component developing method.

In FIG. 1, a developing device 20 comprises a toner container 3 for storing a magnetic one-component toner, a developing sleeve 1a which is arranged in the opening portion of the toner container 3 to be rotatable in the direction of an arrow in FIG. 1, and uses a non-magnetic member, a permanent magnet 1b fixed in the interior of the developing sleeve 1a, a magnetic blade 2 which is fixed to the toner container 3 and uses a magnetic member for regulating the thickness of a toner layer, and a toner convey member 4 arranged in the toner container 3. The magnetic blade 2 is arranged to have a constant distance value W from the developing sleeve 1a. In general, the distance is often set to fall within a range from 100 $\mu$m to 1 mm.

In the developing device shown in FIG. 1, a magnetic one-component toner is coated as a thin layer on the developing sleeve 1a. The thickness of the toner layer is determined by the position of a cut line L shown in FIG. 2.

According to the examinations of the present inventors, it was found that an electric charge was developed in a magnetic toner T when the magnetic toner T passed between the developing sleeve 1a and the magnetic blade 2. It was also found that the magnetic toner behaved as follows.

As shown in FIG. 3, planes perpendicular to a line connecting the developing sleeve 1a and the magnetic blade 2 are assumed, the plane closer to the magnetic blade 2 is represented by S1, and the plane closer to the developing sleeve 1a is represented by S2. In general, since the width of the magnetic blade 2 is set to be smaller than that of the permanent magnet 1b, the magnetic flux densities on the planes S1 and S2 are set, so that the magnetic flux density on the plane S1 becomes larger than that on the plane S2. Therefore, the magnetic toner T receives a force in the direction of an arrow in FIG. 3, i.e., a force toward the magnetic blade 2 side, between the developing sleeve 1a and the magnetic blade 2.

Therefore, as shown in FIG. 2, magnetic toner particles T form ears (state B), and these ears are formed from the magnetic blade 2 in the direction of the magnetic sleeve 1a. The magnetic toner T is charged as follows. That is, when the developing sleeve 1a contacts a toner particle t1 at the distal end of the ear formed from the magnetic blade 2, an electric charge is developed in the distal end.

Furthermore, it was found that the toner was conveyed as follows between the developing sleeve 1a and the magnetic blade 2.

As described above, since an electric charge is developed in the toner particle t1 at the distal end of the ear which contacts the developing sleeve 1a, a force in the direction of the developing sleeve 1a based on a reflection force acts on the toner particle $t_1$, and a convey force in the rotational direction of the developing sleeve 1a acts on the toner particle $t_1$ by a frictional force with the developing sleeve 1a.

Since a given cohesive force acts between toner particles, a convey force also acts on a toner particle t2, which is in contact with the toner particle t1, via the cohesive force. Furthermore, a convey force via the cohesive force similarly acts on a toner particle t3 in an upper layer portion.

However, the magnetic force in the direction of the magnetic blade 2 acts on the toner between the developing sleeve 1a and the magnetic blade 2, as described above. Therefore, the toner ear is torn off at a position where the convey force acting on the toner overcomes the magnetic force, i.e., at the position of the cut line L in FIG. 2, and the toner particles remaining on the developing sleeve 1a are conveyed in the rotational direction of the developing sleeve 1a.

Therefore, as is apparent from the toner behavior and a process for developing an electric charge in the toner in the example using the magnetic blade, an electric charge can only be developed in toner particles near the developing sleeve 1a.

In the above-mentioned example, toner particles in which an electric charge is not developed conglomerate, as indicated by C in FIG. 2, and if this conglomerate of toner particles becomes large, the magnetic force continuously holding the toner particles on the magnetic blade 2 side weakens. For this reason, some toner particles in the conglomerated toner particles are conveyed in the rotational direction of the developing sleeve 1a. As a result, some toner particles conveyed on the sleeve 1a do not develop electric charges, and a phenomenon caused by charging instability tends to occur in the prior art.

In order to solve the above-mentioned problem, the present inventors proposed a developing device which can stably develop an electric charge in a magnetic toner by returning insufficiently charged magnetic toner particles into a developing container by a developing agent regulating member in Ser. No. 250,682.

More specifically, as shown in FIG. 4, as a member for regulating a toner layer coated on the developing sleeve 1a, a developing agent regulating member 6a, which consists of a non-magnetic member, is rotatably arranged near the developing sleeve 1a to face it. In the developing agent regulating member 6a, a permanent magnet 6b is arranged near a magnetic pole N11 of the permanent magnet 1b. Furthermore, a magnetic pole S61 of the permanent magnet 6b in the developing agent regulating member 6a faces the magnetic pole N11 of the permanent magnet 1b in the developing sleeve 1a, and the rotational direction of the developing agent regulating member 6a is set to be the same as that of the developing sleeve 1a. With this arrangement, magnetic toner particles which do not contact the surface of the developing sleeve 1a can be returned into the developing container, and only sufficiently charged magnetic toner particles can be conveyed, thus stabilizing a charging operation of the toner.

As described above, when the developing agent regulating member 6a, which includes the permanent magnet 6b therein, is rotatably arranged near the developing sleeve 1a, the charging operation of the magnetic toner can be stabilized.

However, in the above-mentioned proposal, a sufficiently wide latitude in the arrangement for coating only sufficiently charged magnetic toner particles onto the surface of the developing sleeve cannot often be assured depending on the combination of the magnetic pole N11 in the developing sleeve 1a and the magnetic pole S61 in the developing agent regulating member 6a, cohesion of magnetic toner particles, and the like.

Depending on the combination of the magnetic pole N11 in the developing sleeve 1a and the magnetic pole S61 in the developing agent regulating member 6a, or when the developing agent regulating member 6a consists of a magnetic member, and the width of the member 6a is set to be smaller than the width of the magnetic pole N11, if the rigidity of the developing agent regulating member 6a is low, then the developing agent regulating member 6a flexes by a magnetic force, resulting in coating nonuniformity of a toner layer.

SUMMARY OF THE INVENTION

It is an object of the present invention to provide a developing device which can convey only sufficiently charged toner particles to a developing region.

It is another object of the present invention to provide a developing device which can prevent flexure of a regulating member for regulating the toner amount due to a magnetic force.

It is still another object of the present invention to provide a developing device comprising: a toner carrier which moves while carrying a toner on a surface thereof; and a regulating member for regulating an amount of toner on the toner carrier by applying a moving force to the toner in a direction opposite to a moving direction of the toner carrier, wherein in a regulating portion defined by the regulating member, a moving force received by toner which is not in contact *with* the surface of the toner carrier, from the regulating member, is larger than a convey force received from the toner carrier.

It is still another object of the present invention to provide a developing device comprising: a toner carrier which faces an image carrier for carrying an electrostatic latent image, and which rotates while carrying a toner on a surface thereof; and a regulating rotary member for regulating an amount of toner on the toner carrier by rotation, wherein a regulating portion of the regulating rotary member is arranged on a side of the regulating member opposite the image carrier with respect to a line in a direction of gravity which passes through the center of rotation of the toner carrier.

It is still another object of the present invention to provide a developing device comprising: a toner carrier, having a magnet therein, for carrying a magnetic toner; a regulating rotary member, having a magnet therein, for regulating an amount of toner on the toner carrier; and magnetic field generating means for applying, to the regulating rotary member, a magnetic force in a direction substantially opposite to a direction of a magnetic force received by the regulating rotary member from the magnet in the toner carrier.

Other objects of the present invention will become apparent from the following description.

DESCRIPTION OF THE PREFERRED EMBODIMENTS

Figure 1:
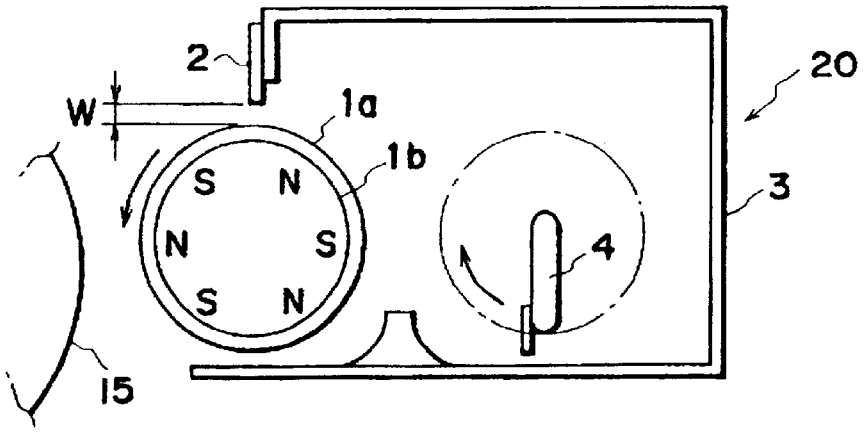
FIG. 1 PRIOR ART
FIG. 1 is a sectional view of a conventional developing device.
Figure 2:
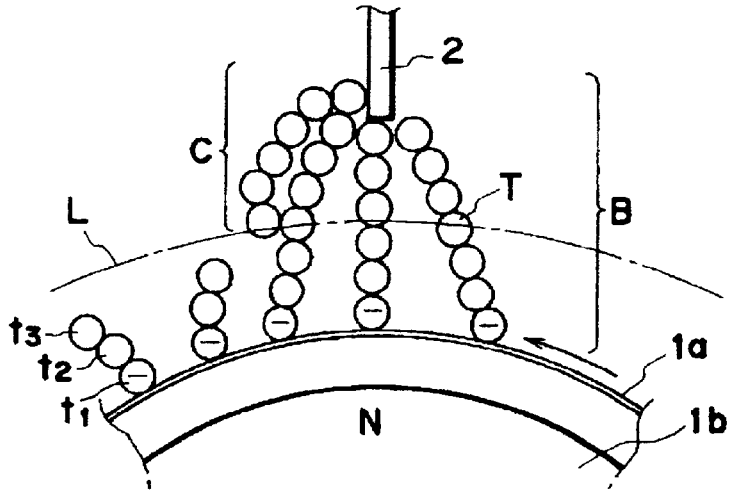
FIG. 2 PRIOR ART
FIG. 2 is an enlarged sectional view of a layer thickness regulating portion in the device shown in FIG. 1.
Figure 3:
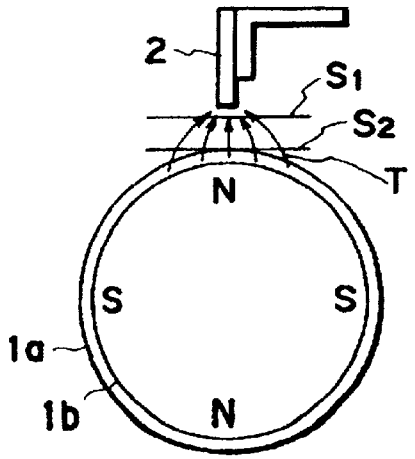
FIG. 3 is a view for explaining the concentration of a magnetic field in the device shown in FIG. 1.
Figure 4:
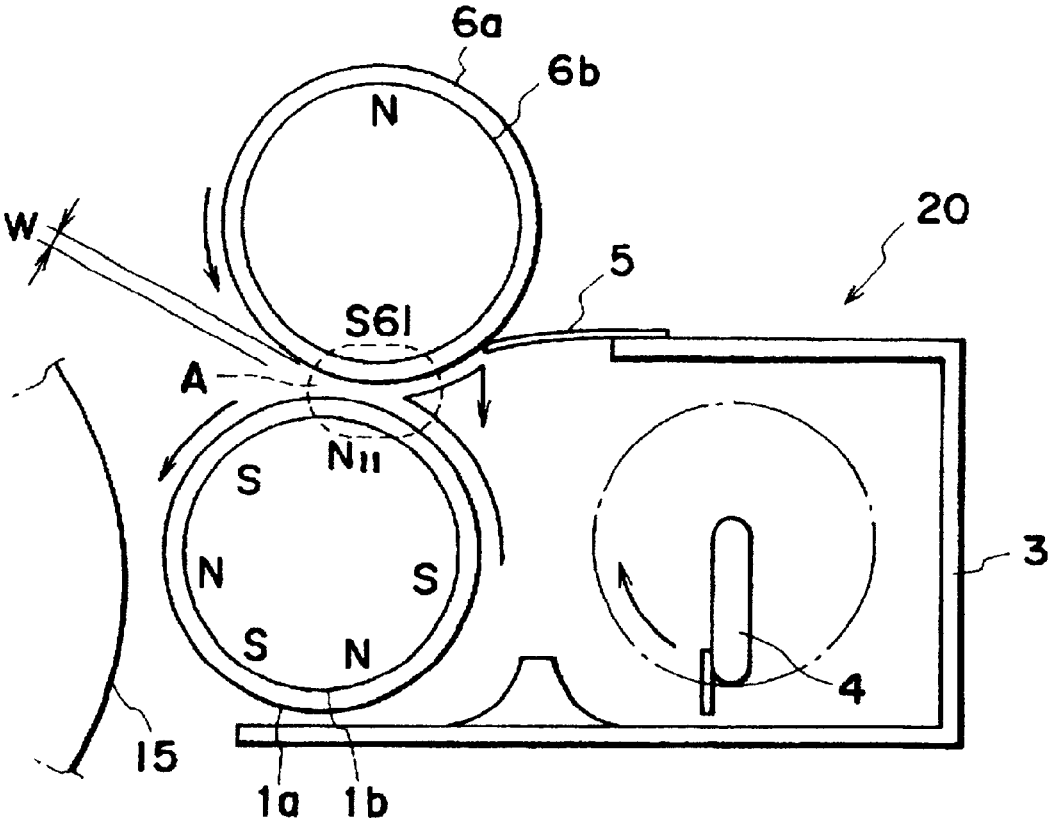
FIG. 4 PRIOR ART
FIG. 4 is a sectional view showing another conventional developing device.
Figure 5:
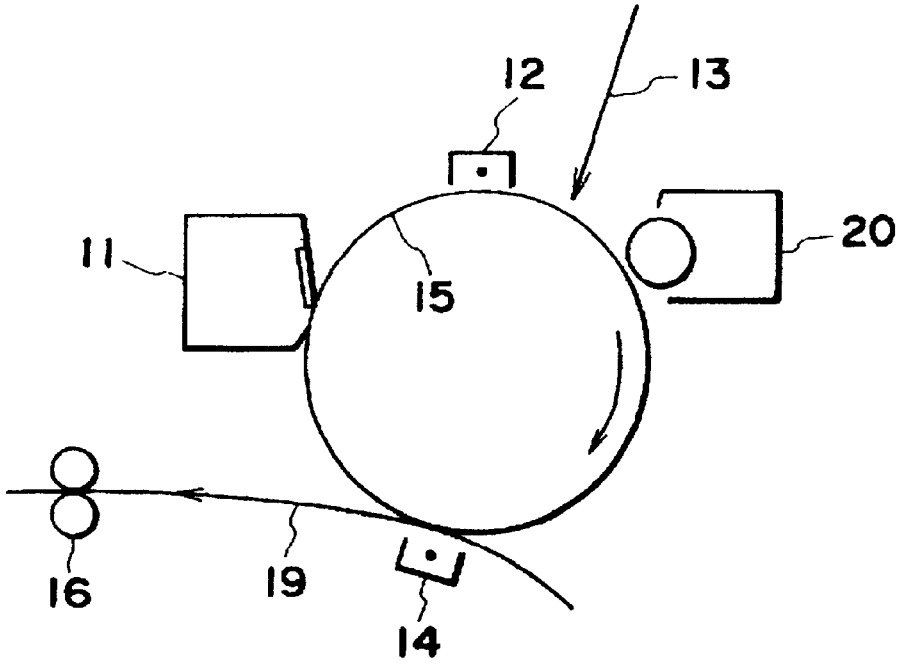
FIG. 5 is a schematic view showing the arrangement of an image forming apparatus to which a developing device of the present invention can be applied.

FIG. 5 is a schematic view of an electrophotographic image forming apparatus to which a developing device according to each embodiment of the present invention can be applied.

As an electrostatic latent image carrier, a drum-shaped electrophotographic photosensitive body constituted by coating a photoconductive layer on a conductive substrate, i.e., a photosensitive drum 15, is rotatably arranged. The photosensitive drum 15 is uniformly charged by a charger 12, and an electrostatic latent image is formed on the drum 15 by exposing an information signal using a light-emitting element 13 such as a laser. The electrostatic latent image is then visualized by a developing device 20. The visualized image (toner image) is transferred onto a transfer member 19 by a transfer charger 14, and the transferred image is fixed by a fixing device 16, thus obtaining a permanent image. Note that the residual toner on the photosensitive drum 15 after the transfer operation is removed by a cleaning device 11.

[First Embodiment]

Figure 6:
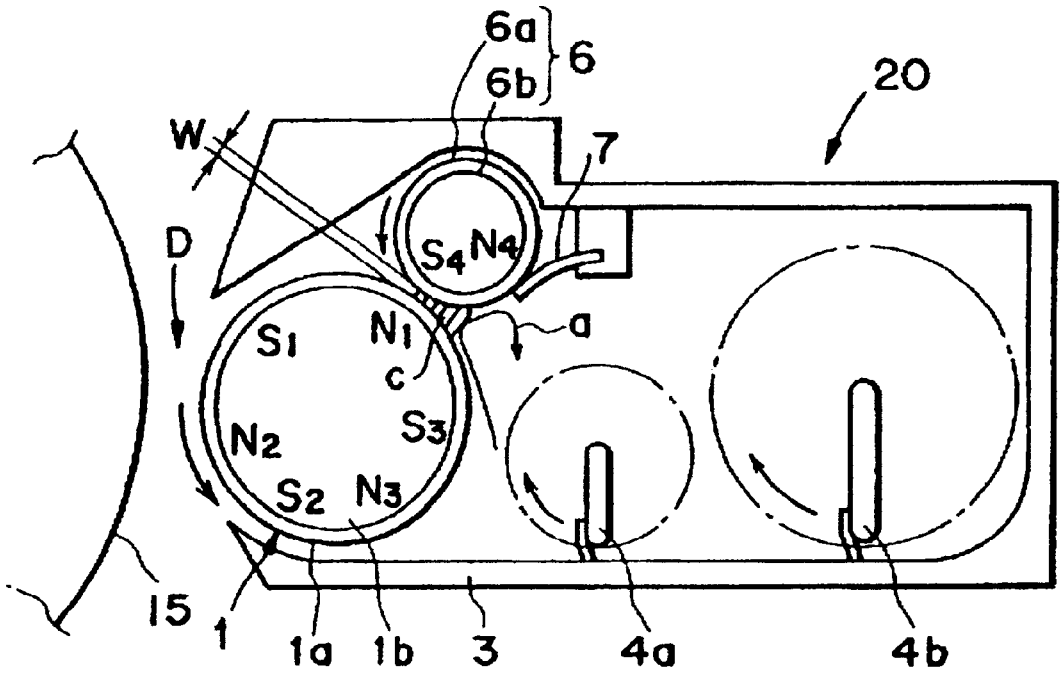
FIG. 6 is a sectional view of a developing device according to a first embodiment of the present invention.

FIG. 6 is a sectional view of a developing device according to the first embodiment of the present invention.

Referring to FIG. 6, the developing device 20 has a developing sleeve 1a as a toner carrier (1), which faces the photosensitive drum 15 as a latent image carrier via the opening portion of a developing container 3, consists of a non-magnetic metal member, and is rotated in the direction of an arrow in FIG. 6. A permanent magnet 1b having a plurality of magnetic poles is fixed in the developing sleeve 1a. Convey members 4a and 4b are arranged in the developing container 3 to be rotatable in the directions of arrows in FIG. 6 so as to convey a magnetic toner in the direction of the developing sleeve 1a. Furthermore, a developing agent (toner) amount regulating member 6 is arranged in the vicinity of the developing sleeve 1a to extend in the same direction as the extending direction of the sleeve 1a. Moreover, a scraper 7, which has one end contacting the toner amount regulating member 6, is attached to the developing container 3.

The toner amount regulating member 6 is constituted by a cylindrical non-magnetic member 6a and a permanent magnet 6b fixed inside the non-magnetic member 6a, and is arranged near the developing sleeve 1a at the upstream side in the rotational direction of the developing sleeve 1a with respect to a developing region D. The non-magnetic member 6a is arranged to be rotatable in the same rotational direction as that of the developing sleeve 1a, as indicated by an arrow in FIG. 6.

The permanent magnet 6b is designed to have at least one magnetic pole, which has a polarity different from that of at least one of the magnetic poles of the permanent magnet 1b arranged in the developing sleeve 1a.

The permanent magnet 6b is designed so that a magnetic pole (N1) in the permanent magnet 1b arranged in the developing sleeve 1a is close to and faces a magnetic pole (S4) of the permanent magnet 6b, which pole has a polarity different from that of the magnetic pole (N1).

Furthermore, the width of the magnetic pole (S4) of the permanent magnet 6b, which is arranged to be close to and to face the magnetic pole (N1) in the developing sleeve 1a is set to be smaller than that of the magnetic pole (N1) in the developing sleeve 1a, so that the magnetic flux density of a magnetic field formed between the magnetic poles (N1) and (S4) increases from the developing sleeve 1a toward the toner amount regulating member 6 side.

With the above-mentioned arrangement, a force based on a magnetic force from the developing sleeve 1a toward the toner amount regulating member 6 side acts on a magnetic toner T present between the toner amount regulating member 6 and the developing sleeve 1a.

In this embodiment, since the non-magnetic member 6a is rotated in the direction of an arrow in FIG. 6, which is the same as the rotational direction of the developing sleeve 1a, as shown in FIG. 6, a convey force from the toner amount regulating member 6 in the direction of the interior of the developing container 3 acts on the magnetic toner T on the basis of the force of the magnetic field, a frictional force with the non-magnetic member 6a, and a frictional force between magnetic toner particles.

As described above, magnetic toner particles T which contact the developing sleeve 1a are charged by an electric charge generated by triboelectric charging with the developing sleeve 1a, a force in the direction of the developing sleeve 1a based on a reflection force that acts on the electrically charged magnetic toner particles T, and a convey force in the rotational direction of the developing sleeve 1a that acts on the charged magnetic toner particles T due to a frictional force with the developing sleeve 1a.

Figure 8:
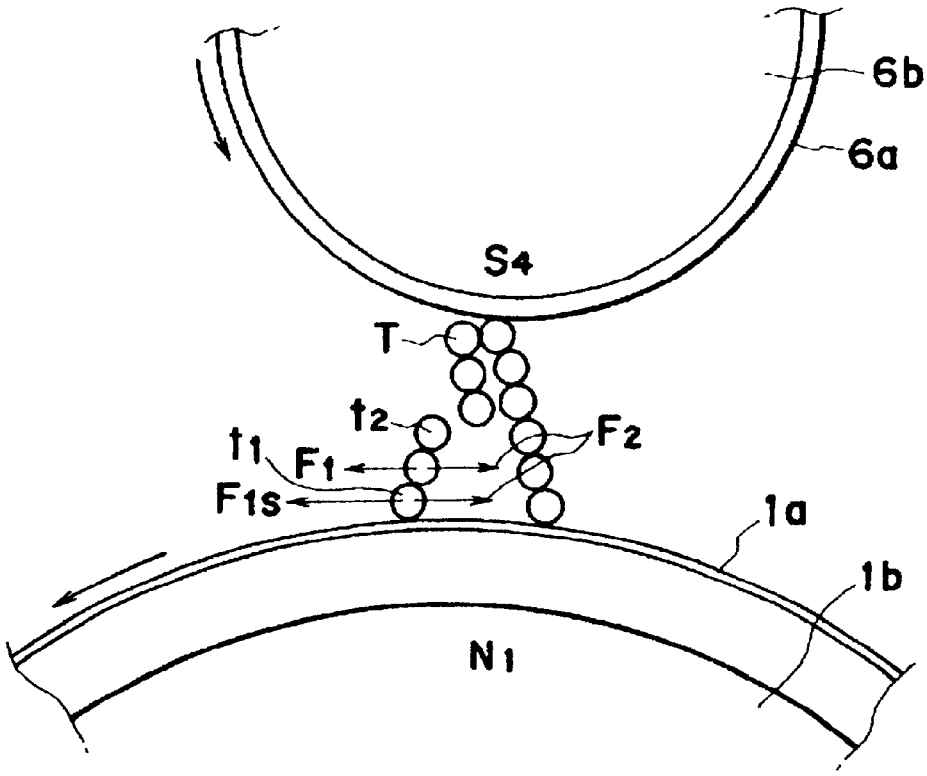
FIG. 8 is an enlarged sectional view of a layer thickness regulating portion in the embodiment shown in FIG. 6.

Therefore, in the developing device 20 with the arrangement shown in FIG. 6, magnetic toner particles t1, contacting the developing sleeve 1a, of the magnetic toner T present in a toner amount regulating portion receive a convey force (F1S) acting from the toner carrier 1 depending on the triboelectric charge amount of the magnetic toner and a convey force (F2) acting from the toner amount regulating member 6 as principal forces of the convey force, as shown in FIG. 8.

Also, magnetic toner particles t2, which do not contact the developing sleeve 1a, receive a convey force (F1) acting from the toner carrier 1 and the convey force (F2) acting from the toner amount regulating member 6 via a cohesive force among magnetic toner particles as principal forces of the convey force.

Therefore, if the following relations are satisfied, magnetic toner particles conveyed to a developing region are only those which are sufficiently charged:

$$F1S \geqq F2 \quad (1)$$

$$F1 < F2 \quad (2)$$

Although the arrangement which satisfies the above-mentioned relations varies depending on the characteristics of a magnetic toner, in this embodiment, when the magnetic flux density of the magnetic pole (S4) of the permanent magnet 6b, which is arranged to be close to and face the magnetic pole (N1) in the developing sleeve 1a, is set to be 800 Gausses, the magnetic flux density in the magnetic pole (N1) in the developing sleeve 1a is set to be 900 Gausses, the ratio between the widths (to be referred to as 50% values hereinafter for the sake of simplicity) of regions indicating the peak values of the magnetic flux densities of the magnetic poles is set to satisfy the following relation:

(50% value of magnetic pole S4)/(50% value of magnetic pole N1)=0.8 and the width of the magnetic pole (S4) is set to be smaller than that of the magnetic pole (N1), so that the magnetic flux density of a magnetic field formed between the magnetic poles (N1) and (S4) increases from the developing sleeve 1a toward the toner amount regulating member 6 side.

It was confirmed that when a distance W between the toner amount regulating member 6 and the toner carrier 1 was set to be 1 mm, and the absolute value of the peripheral velocity of the developing sleeve 1a was set to be equal to that of the non-magnetic member 6a, a magnetic toner, which had a weight-average particle size of 5 $\mu$m or more, and contained 10% by weight or more of an internally added magnetic member, satisfied the above-mentioned conditions (1) and (2).

However, as described above, the convey force (F1) from the developing sleeve 1a, which acts on the magnetic toner in the regulating region, changes depending on the cohesive force of the magnetic toner, and the cohesive force of the magnetic toner depends on the amount of magnetic toner present in the toner amount regulating region (a region C in FIG. 6) formed between the toner amount regulating member 6 and the toner carrier 1.

Therefore, in order to stably satisfy the conditions (1) and (2), the magnetic toner amount in the regulating region must always be controlled to be an appropriate amount, and in order to control the amount of magnetic toner held in the regulating region, the amount of magnetic toner conveyed in the direction of the regulating region must be set to be equal to that of magnetic toner conveyed from inside to outside the regulating region.

Therefore, the arrangement for conveying the magnetic toner in the direction of the regulating region and conveying the magnetic toner from inside to outside the regulating region must be adopted. In this embodiment, by adjusting the strengths and arrangement angles of the magnetic poles (N1, S3) in the developing sleeve 1a and the strengths and arrangement angles of the magnetic poles (S4, N4) in the toner amount regulating member 6, the toner amount regulating region (the region C in FIG. 6) formed between the toner amount regulating member 6 and the toner carrier 1 is adjusted. In addition, the arrangement which satisfies the conditions (1) and (2) is adopted near the toner amount regulating member 6 inside and outside the regulating region, so that the convey force (F2) acting from the toner amount regulating member 6 on the magnetic toner serves as a principal force, thereby conveying the magnetic toner from inside to outside the toner amount regulating region.

Also, since a scraper portion for scraping the magnetic toner conveyed by the convey force (F2), which is received from the toner amount regulating member, from the toner amount regulating member using the scraper 7 is arranged outside the toner amount regulating region, a predetermined amount of magnetic toner circulates, as indicated by an arrow a in FIG. 6.

With the above-mentioned arrangement, the amount of magnetic toner conveyed into the toner amount regulating region C and the amount of magnetic toner conveyed from inside to outside the region can be controlled, and the conditions (1) and (2) can be stably satisfied.

In order to stabilize the control of the amount of magnetic toner conveyed into the toner amount regulating region C and the amount of magnetic toner conveyed from inside to outside the region, it is preferable that the magnetic toner scraped by the scraper 7 be not immediately conveyed by gravity in the direction of the regulating region C. Therefore, in this embodiment, the arrangement positions of the regulating region C, the toner amount regulating member 6, and the scraper 7 are adjusted, so that the direction of the convey force depending on gravity and acting on the magnetic toner does not point in the direction of the toner amount regulating region C in a region where the convey force received from the toner amount regulating member 6 substantially disappears, and the magnetic toner is no longer conveyed by the toner amount regulating member 6.

The present invention is not limited to the above-mentioned arrangement, and it is preferable that the magnetic flux densities and 50% values of the magnetic poles, the distance W between the toner amount regulating member 6 and the toner carrier 1, the peripheral velocities of the developing sleeve 1a and the non-magnetic member 6a, and the like be appropriately adjusted in correspondence with the characteristics of the magnetic toner used so as to satisfy the conditions (1) and (2).

As described above, since the developing device shown in FIG. 6 is arranged to satisfy the conditions (1) and (2), only sufficiently charged magnetic toner particles can be carried on the developing sleeve 1a, and can be conveyed to the developing region.

[Second Embodiment]

Figure 7:
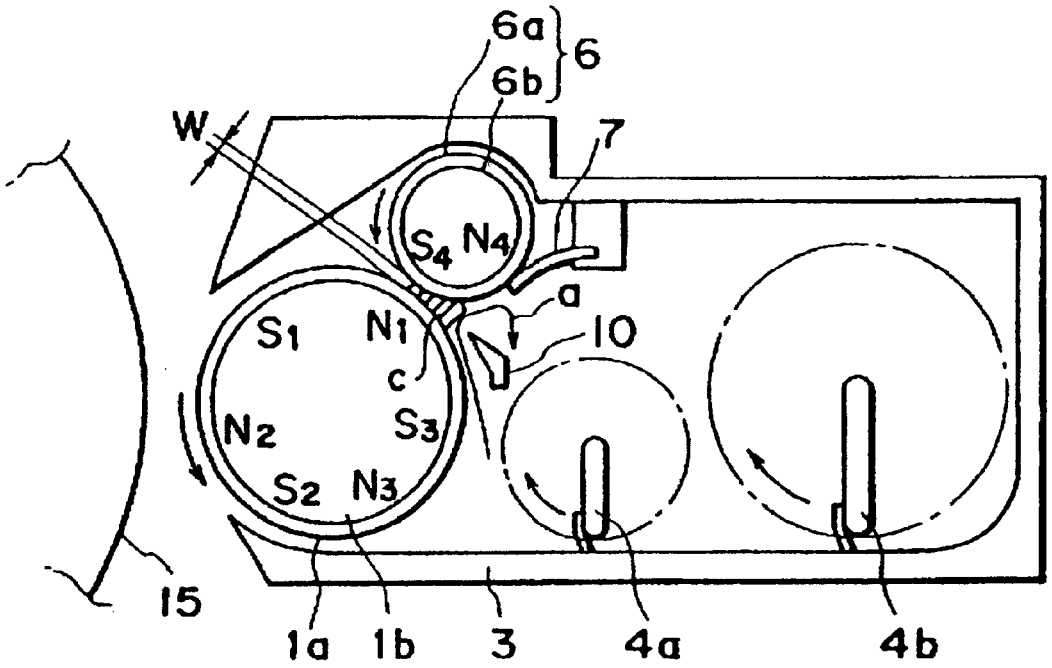
FIG. 7 is a sectional view of a developing device according to a second embodiment of the present invention.

The second embodiment of a developing device for an image forming apparatus according to the present invention will be described below with reference to FIG. 7. Note that since this embodiment has substantially the same arrangement as that of the first embodiment, a detailed description of the same portions will be omitted, and only the characteristic portions will be explained below.

As has been described in the description of the first embodiment, in order to stably satisfy the conditions (1) and (2), it is preferable that the magnetic toner scraped by the scraper 7 be not immediately conveyed in the direction of the regulating region C. Therefore, it is preferable that the convey force acting from the toner carrier 1 on the magnetic toner also substantially disappears near the scraper 7 portion. The convey force received by magnetic toner particles, which do not contact the toner carrier 1, from the toner carrier 1 is transmitted by contact among the magnetic toner particles, as described above. Therefore, when the magnetic toner particles near the scraper 7 portion are prevented from contacting the magnetic toner particles contacting the toner carrier 1 near the scraper 7 portion, the magnetic toner scraped by the scraper 7 is not immediately conveyed in the direction of the regulating region.

Therefore, in this embodiment, in the arrangement of the developing device of the first embodiment, a toner convey guide 10 is arranged near the scraper 7, so that the convey force acting from the toner carrier 1 on the magnetic toner also substantially disappears in a region where the convey force received from the toner amount regulating member 6 substantially disappears, and the magnetic toner is no longer conveyed by the toner amount regulating member 6.

With the above-mentioned arrangement, the amount of magnetic toner conveyed into the toner amount regulating region C and the amount of magnetic toner conveyed from inside to outside the region can be controlled, and the conditions (1) and (2) can be stably satisfied.

[Third Embodiment]

The third embodiment of a developing device for an image forming apparatus according to the present invention will be described below with reference to FIG. 9.

Figure 9:
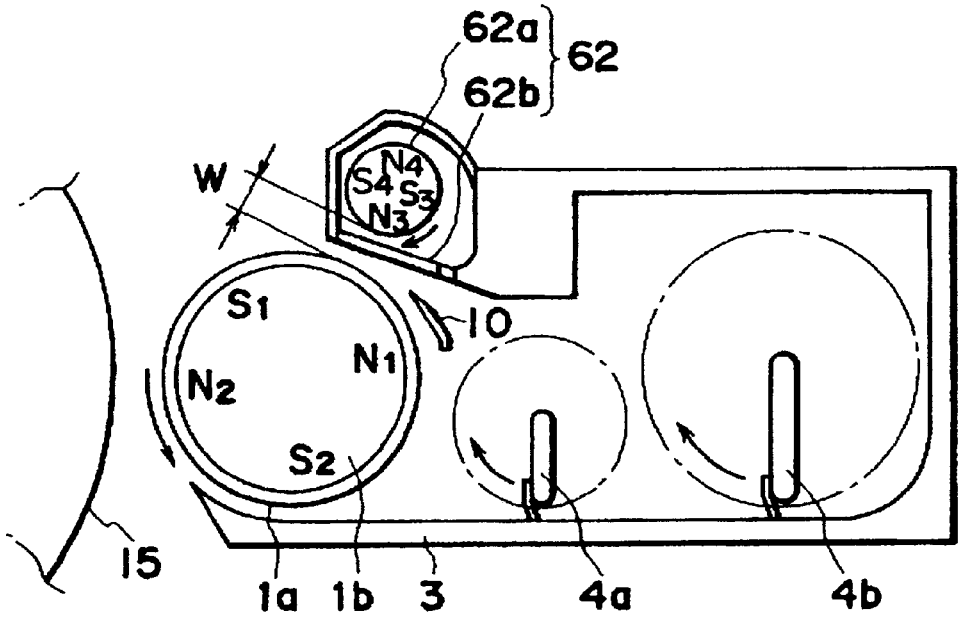
FIG. 9 is a sectional view of a developing device according to a third embodiment of the present invention.

Referring to FIG. 9, a developing device 20 has a developing sleeve 1a as a toner carrier (1), which faces a photosensitive drum 15 as a latent image carrier via the opening portion of a developing container 3, consists of a non-magnetic metal member, and is rotated in the direction of an arrow in FIG. 9. A permanent magnet 1b having a plurality of magnetic poles is fixed in the developing sleeve 1a. Convey members 4a and 4b for conveying a magnetic toner in the direction of the developing sleeve 1a are arranged in the developing container 3 to be rotatable in the directions of respective arrows in FIG. 9. Furthermore, a toner amount regulating member 62 is arranged in the vicinity of the developing sleeve 1a to extend in the same direction as the extending direction of the sleeve 1a.

The toner amount regulating member 62 is constituted by a rotatable permanent magnet 62a which has at least two magnetic poles, and a non-magnetic member 62b, which is arranged near the developing sleeve 1a and the permanent magnet 62a to separate them from each other. The toner amount regulating member 62 is arranged in the vicinity of a position between magnetic poles of the permanent magnet 1b arranged in the developing sleeve 1a.

The toner amount regulating member 62 is arranged near the developing sleeve 1a at the upstream side in the rotational direction of the developing sleeve 1a, and the permanent magnet 62a is arranged to be rotatable in the direction of the arrow in FIG. 9 opposite to the rotational direction of the developing sleeve 1a.

With the above-mentioned arrangement, a magnetic toner T present between the toner amount regulating member 62 and the developing sleeve 1a receives the convey forces as in the first embodiment from the permanent magnet 62a of the toner amount regulating member 62 and the developing sleeve 1a. Therefore, the same effect as in the first embodiment can be expected by appropriately adjusting the number of magnetic poles, and the magnetic flux densities and 50% values of the magnetic poles of the permanent magnet 62a, a distance W between the permanent magnet 62a and the developing sleeve 1a, the rotational speeds of the permanent magnet 62a and the developing sleeve 1a, and the like in correspondence with the characteristics of the magnetic toner used, so as to satisfy:

$$F1S \geqq F2 \quad (1)$$

$$F1 < F2 \quad (2)$$

The arrangement which satisfies the above-mentioned relations varies depending on the characteristics of a magnetic toner. In this embodiment, it was confirmed that when the permanent magnet 62a had a four-pole arrangement, the magnetic flux densities of the magnetic poles were set to be 400 Gausses or higher, the 50% values of the magnetic poles had 30° or more in an angle, the distance W between the permanent magnet 62a and the toner carrier 1 was set to be about 1 mm, and the absolute value of the peripheral velocity of the developing sleeve 1a was set to be twice or more that of the permanent magnet 62a, a magnetic toner, which had a weight-average particle size of 5 $\mu$m or more, and contained 10% by weight or more of an internally added magnetic member, satisfied the above-mentioned conditions (1) and (2).

As has been described in the first embodiment, in order to stably satisfy the conditions (1) and (2), it is preferable that the magnetic toner which drops when the convey force received from the toner amount regulating member 62 substantially disappears be not immediately conveyed in the direction of the regulating region.

Therefore, in this embodiment, a toner convey guide 10 is arranged between the toner carrier 1 and the toner amount regulating member 62, so that the convey force acting from the toner carrier 1 on the magnetic toner also substantially disappears in a region where the convey force received from the toner amount regulating member 62 substantially disappears, and the magnetic toner is no longer conveyed by the toner amount regulating member 62.

With the above-mentioned arrangement, the amount of magnetic toner conveyed into the toner amount regulating region and the amount of magnetic toner conveyed from inside to outside the region can be controlled, and the conditions (1) and (2) can be stably satisfied.

Note that this embodiment is not limited to the above arrangement, and it is preferable that the arrangement conditions be appropriately adjusted to satisfy the conditions (1) and (2) in correspondence with the characteristics of the magnetic toner used.

As described above, since the developing device shown in FIG. 9 is arranged to satisfy the conditions (1) and (2), only sufficiently charged magnetic toner particles can be carried on the developing sleeve 1a and can be conveyed to the developing region as in the first embodiment.

In this manner, insufficiently charged magnetic toner particles can be prevented from being conveyed to the developing region, and only sufficiently charged magnetic toner particles can be conveyed to the developing region. Therefore, the problem associated with charging instability can be solved, and a high-quality image can be obtained.

[Fourth Embodiment]

The fourth embodiment of the present invention will be described below with reference to FIG. 10.

Figure 10:
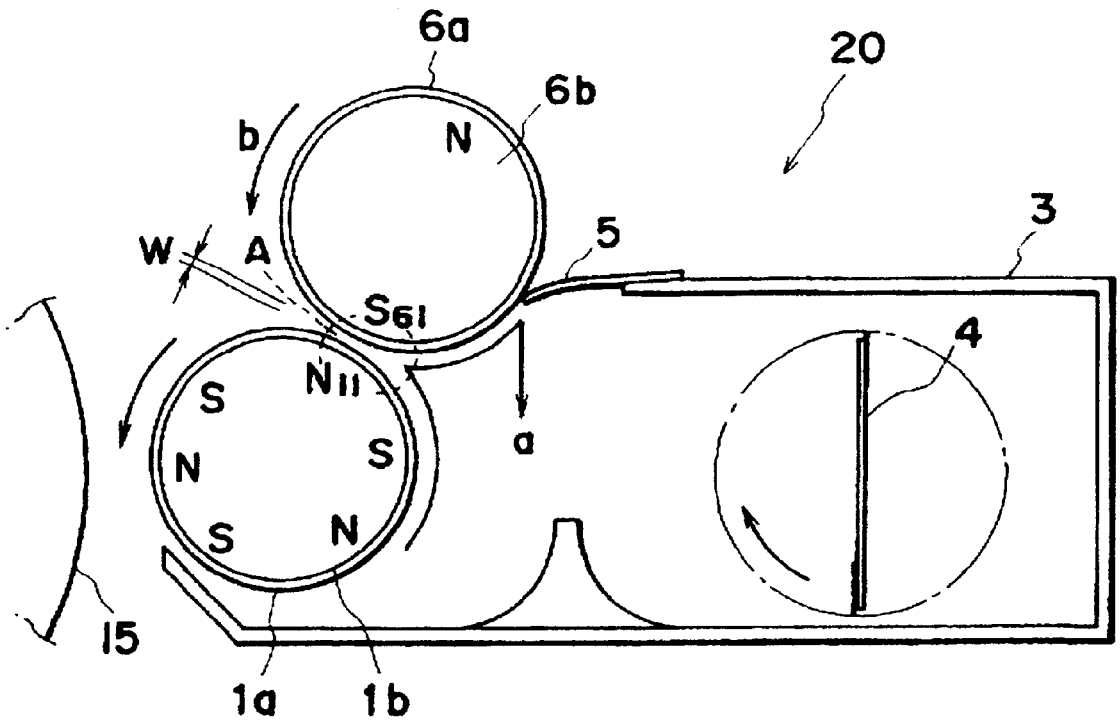
FIG. 10 is a sectional view of a developing device according to a fourth embodiment of the present invention.

Referring to FIG. 10, a developing device 20 has a developing sleeve 1a as a toner carrier, which faces a photosensitive drum 15 as a latent image carrier via the opening portion of a developing container 3, consists of a non-magnetic metal member, and is rotated in the direction of an arrow in FIG. 10. A permanent magnet 1b having a plurality of magnetic poles is fixed in the developing sleeve 1a. A convey member 4 is arranged in the developing container 3 to be rotatable in the direction of an arrow in FIG. 10 so as to convey a magnetic toner in the direction of the developing sleeve 1a. Furthermore, a toner regulating member 6a is arranged in the vicinity of the developing sleeve 1a to extend in the same direction as the extending direction of the sleeve 1a. A permanent magnet 6b having a plurality of magnetic poles is fixed in the member 6a. Moreover, a scraper 5, which has one end contacting the toner regulating member 6a, is attached to the developing container 3.

In this embodiment, a regulating portion defined by the toner regulating member 6a is arranged on the side opposite to the photosensitive drum 15 with respect to a line in the direction of gravity, which passes the center of the developing sleeve 1a, i.e., on the side of the developing container 3.

Also, the regulating portion is arranged above a line in the horizontal direction, which passes the center of the developing sleeve 1a.

In this embodiment, the magnetic flux density of a magnetic pole S61 in the permanent magnet 6b, which is arranged to be close to and face a magnetic pole N11 in the permanent magnet 1b located at the opposing position between the developing sleeve 1a and the toner regulating member 6a is set to be 800 Gausses, and the magnetic flux density of the magnetic pole N11 is set to be 900 Gausses. Also, the ratio between the widths (to be referred to as 50% values hereinafter for the sake of simplicity) of regions indicating values of 50% or higher with respect to the peak values of the magnetic flux densities of the magnetic poles is set to satisfy the following relation:

(50% value of magnetic pole S61)/(50% value of magnetic pole N11)≅0.8 and the width of the magnetic pole S61 is set to be smaller than that of the magnetic pole N11, so that the magnetic flux density of a magnetic field formed between the magnetic poles S61 and N11 changes to increase from the developing sleeve 1a toward the toner regulating member 6a side. Furthermore, a distance W between the developing sleeve 1a and the toner regulating member 6a is set to fall within a range from 100 $\mu$m to 2 mm, and the ratio between the absolute values of the peripheral velocities of the developing sleeve 1a and the toner regulating member 6a is set to satisfy:

(Absolute value of peripheral velocity of toner regulating member 6a)/(absolute value of peripheral velocity of developing sleeve 1a)>0.5

The magnetic toner has a weight-average particle size of 5 $\mu$m or more, and contains 10% by weight or more of an internally added magnetic member.

In the developing device with the arrangement shown in FIG. 10, since the magnetic flux density becomes higher from the developing sleeve 1a toward the toner regulating member 6a side, a magnetic force from the developing sleeve 1a toward the toner regulating member 6a acts on the magnetic toner present between the developing sleeve 1a and the toner regulating member 6a. Therefore, magnetic toner particles which have a smaller reflection force with the developing sleeve 1a than the magnetic force and are not sufficiently charged are held at the toner regulating member 6a side.

In this embodiment, since the toner regulating member 6a is rotated in the direction of an arrow b in FIG. 10, which is the same as the rotational direction of the developing sleeve 1a, magnetic toner particles, which are insufficiently charged and held on the surface of the toner regulating member 6a by the magnetic force, receive a convey force from the toner regulating member 6a into the developing container 3 on the basis of the force of the magnetic field and a frictional force with the surface of the toner regulating member 6a.

Since the arrangement position of the toner regulating member 6a is set in the first quadrant (see FIG. 8) on a two-dimensional coordinate system having the center of the developing sleeve 1a as an origin, the direction of a convey force depending on gravity and acting on the magnetic toner is set not to coincide with the direction of a toner amount regulating region A in a convey path of the magnetic toner which is scooped up from the developing sleeve 1a side in the developing container 3 and is returned into the developing container 3 by the toner regulating member 6a, thereby stably returning insufficiently charged magnetic toner particles from the toner amount regulating region A into the developing container.

Therefore, insufficiently charged magnetic toner particles are not conveyed to the developing region beyond the opposing position between the developing sleeve 1a and the toner regulating member 6a.

A magnetic toner portion returned into the developing container 3 is scraped from the surface of the toner regulating member 6a by the scraper 5. The magnetic toner portion, which is returned into the developing container 3 in this manner, is stirred with the remaining toner portion by the convey member 4, and is conveyed along the surface of the developing sleeve 1a again to the opposing position between the magnetic poles N11 and S61. The circulating path of the magnetic toner in the developing container 3 in this case is as indicated by an arrow a in FIG. 10.

The magnetic toner is charged by friction with the surface of the developing sleeve 1a in the developing container 3. The charged magnetic toner becomes attached to the surface of the developing sleeve 1a by a reflection force based on the electric charge of the toner itself, and is conveyed to the opposing position between the developing sleeve 1a and the toner regulating member 6a. When the toner is conveyed to the opposing position, insufficiently charged magnetic toner particles are returned from the opposing position between the developing sleeve 1a and the toner regulating member 6a into the developing container 3 for the above-mentioned reason.

Therefore, magnetic toner particles which are conveyed to the developing region via the opposing position between the developing sleeve 1a and the toner regulating member 6a are only sufficiently charged magnetic toner particles, which have acquired a reflection force with the developing sleeve 1a, which exceeds the convey force in the direction toward the interior of the developing container 3.

More specifically, according to the arrangement of this embodiment, a wide latitude in the arrangement for stably coating only a sufficiently charged magnetic toner layer on the surface of the developing sleeve, and conveying the toner to the developing region can be warranted.

[Fifth Embodiment]

Figure 11:
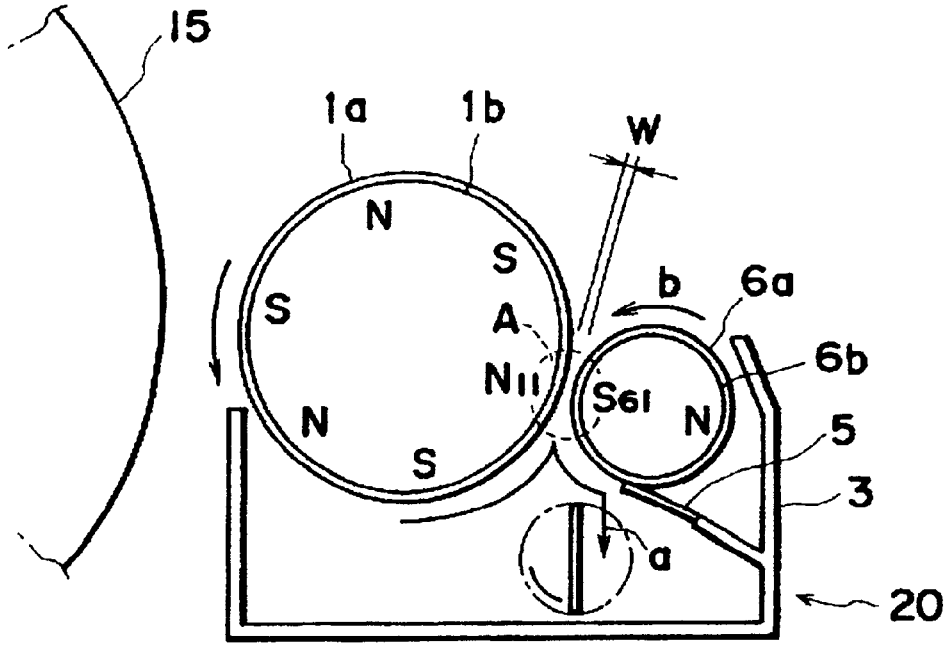
FIG. 11 is a sectional view of a developing device according to a fifth embodiment of the present invention.

Referring to FIG. 11, a developing device 20 has a developing sleeve 1a as a toner carrier, which faces a photosensitive drum 15 as a latent image carrier via the opening portion of a developing container 3, consists of a non-magnetic metal member, and is rotated in the direction of an arrow in FIG. 11. A permanent magnet 1b having a plurality of magnetic poles is fixed in the developing sleeve 1a. Furthermore, a toner regulating member 6a is arranged in the vicinity of the developing sleeve 1a to extend in the same direction as the extending direction of the sleeve 1a. A permanent magnet 6b having a plurality of magnetic poles is fixed in the member 6a. Moreover, a scraper 5, which has one end contacting the toner regulating member 6a, is attached to the developing container 3.

In this embodiment, a regulating portion defined by the toner regulating member 6a is arranged on the side opposite to the photosensitive drum 15 with respect to a line in the direction of gravity, which passes the center of the developing sleeve 1a, and below a line in the horizontal direction, which passes the center of the developing sleeve 1a.

In this embodiment, the magnetic flux density of a magnetic pole S61 in the permanent magnet 6b, which is arranged to be close to and face a magnetic pole N11 in the permanent magnet 1b located at the opposing position between the developing sleeve 1a and the toner regulating member 6a is set to be 800 Gausses, and the magnetic flux density of the magnetic pole N11 is set to be 900 Gausses. Also, the ratio between the 50% values of the magnetic poles is set to satisfy the following relation:

(50% value of magnetic pole S61)/(50% value of magnetic pole N11)≈0.8 and the width of the magnetic pole S61 is set to be smaller than that of the magnetic pole N11, so that the magnetic flux density of a magnetic field formed between the magnetic poles S61 and N11 increases from the developing sleeve 1a toward the toner regulating member 6a side. Furthermore, a distance W between the developing sleeve 1a and the toner regulating member 6a is set to fall within a range from 100 μm to 2 mm, and the ratio between the absolute values of the peripheral velocities of the developing sleeve 1a and the toner regulating member 6a is set to satisfy:

(Absolute value of peripheral velocity of toner regulating member 6a)/(absolute value of peripheral velocity of developing sleeve 1a)>0.5

The magnetic toner has a weight-average particle size of 5 μm or more, and contains 10% by weight or more of an internally added magnetic member.

In the developing device with the arrangement shown in FIG. 11, since the magnetic flux density becomes higher from the developing sleeve 1a toward the toner regulating member 6a side, a magnetic force from the developing sleeve 1a toward the toner regulating member 6a acts on the magnetic toner present between the developing sleeve 1a and the toner regulating member 6a. Therefore, magnetic toner particles which have a smaller reflection force with the developing sleeve 1a than the magnetic force and are not sufficiently charged are held at the toner regulating member 6a side.

In this embodiment, since the toner regulating member 6a is rotated in the direction of an arrow b in FIG. 11, which is the same as the rotational direction of the developing sleeve 1a, magnetic toner particles, which are insufficiently charged and held on the surface of the toner regulating member 6a by the magnetic force, receive a convey force from the toner regulating member 6a into the developing container 3 on the basis of the force of the magnetic field and a frictional force with the surface of the toner regulating member 6a.

Since the arrangement position of the toner regulating member 6a is set in the fourth quadrant on a two-dimensional coordinate system having the center of the developing sleeve 1a as an origin, the direction of a convey force depending on the gravity and acting on the magnetic toner is set not to coincide with the direction of a toner amount regulating region A in a convey path of the magnetic toner which is scooped up from the developing sleeve 1a side in the developing container 3 and is returned into the developing container 3 by the toner regulating member 6a, thereby stably returning insufficiently charged magnetic toner particles from the toner amount regulating region A into the developing container.

Therefore, insufficiently charged magnetic toner particles are not conveyed to the developing region beyond the opposing position between the developing sleeve 1a and the toner regulating member 6a.

A magnetic toner portion returned into the developing container 3 is scraped from the surface of the toner regulating member 6a by the scraper 5. The magnetic toner portion, which is returned into the developing container 3 in this manner, is stirred with the remaining toner portion by a convey member 4, and is conveyed along the surface of the developing sleeve 1a again to the opposing position between the magnetic poles N11 and S61. The circulating path of the magnetic toner in the developing container 3 in this case is as indicated by an arrow a in FIG. 11.

The magnetic toner is charged by friction with the surface of the developing sleeve 1a in the developing container 3. The charged magnetic toner becomes attached to the surface of the developing sleeve 1a by a reflection force based on the electric charge of the toner itself, and is conveyed to the opposing position between the developing sleeve 1a and the toner regulating member 6a. When the toner is conveyed to the opposing position, insufficiently charged magnetic toner particles are returned from the opposing position between the developing sleeve 1a and the toner regulating member 6a into the developing container 3 for the above-mentioned reason.

Therefore, magnetic toner particles which are conveyed to the developing region via the opposing position between the developing sleeve 1a and the toner regulating member 6a are only sufficiently charged magnetic toner particles, which have acquired a reflection force with the developing sleeve 1a, which exceeds the convey force in the direction toward the interior of the developing container 3.

More specifically, according to the arrangement of this embodiment, a wide latitude in the arrangement for stably coating only a sufficiently charged magnetic toner layer on the surface of the developing sleeve, and conveying the toner to the developing region can be obtained.

[Sixth Embodiment]

Figure 12:
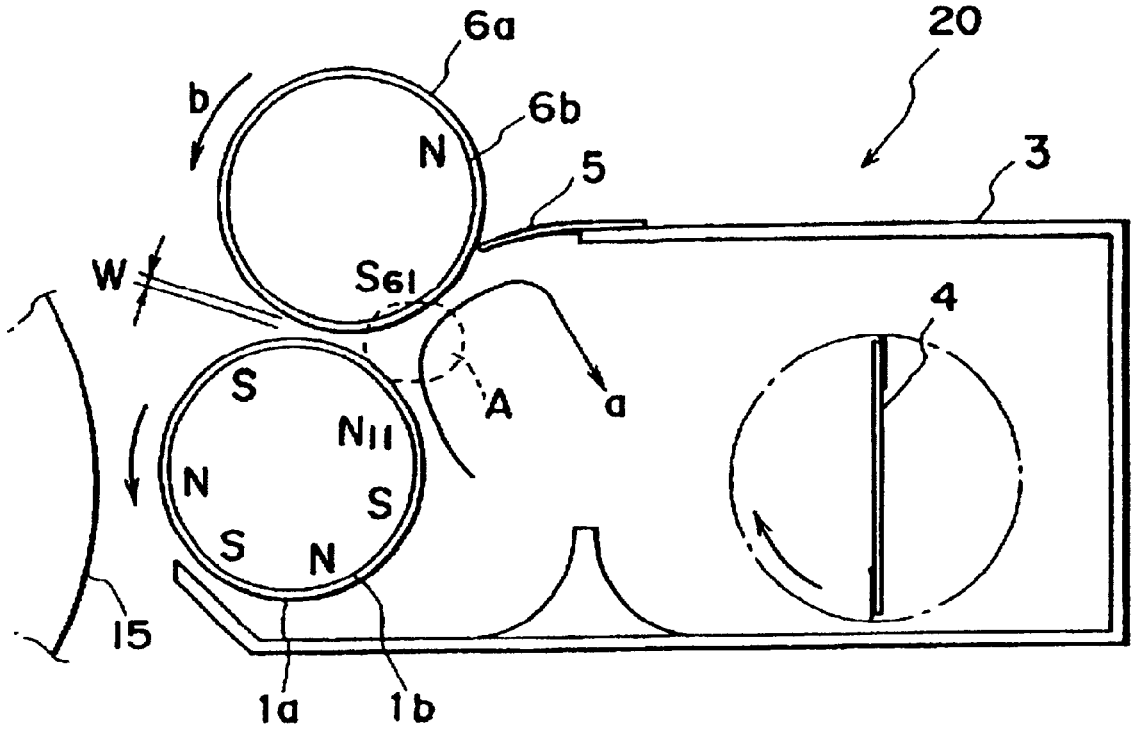
FIG. 12 is a sectional view of a developing device according to a sixth embodiment of the present invention.

Referring to FIG. 12, a developing device 20 has a developing sleeve 1a as a toner carrier, which faces a photosensitive drum 15 as a latent image carrier via the opening portion of a developing container 3, consists of a non-magnetic metal member, and is rotated in the direction of an arrow in FIG. 12. A permanent magnet 1b having a plurality of magnetic poles is fixed in the developing sleeve 1a. A convey member 4 is arranged in the developing container 3 to be rotatable in the direction of an arrow in FIG. 12 so as to convey a magnetic toner in the direction of the developing sleeve 1a. Furthermore, a toner regulating member 6a is arranged in the vicinity of the developing sleeve 1a to extend in the same direction as the extending direction of the sleeve 1a. A permanent magnet 6b having a plurality of magnetic poles is fixed in the member 6a. Moreover, a scraper 5, which has one end contacting the toner regulating member 6a, is attached to the developing container 3.

Note that the toner regulating member 6a is arranged to be rotatable in the same direction of an arrow b as the rotational direction of the developing sleeve 1a.

In this embodiment, the magnetic flux density of a magnetic pole S61 in the permanent magnet 6b, which is arranged to be close to and face a magnetic pole N11 in the permanent magnet 1b located at the opposing position between the developing sleeve 1a and the toner regulating member 6a is set to be 800 Gausses, and the magnetic flux density of the magnetic pole N11 is set to be 900 Gausses. Also, the ratio between the 50% values of the magnetic poles is set to satisfy the following relation:

(50% value of magnetic pole S61)/(50% value of magnetic pole N11)≅0.8 and the width of the magnetic pole S61 is set to be smaller than that of the magnetic pole N11, so that the magnetic flux density of a magnetic field formed between the magnetic poles S61 and N11 changes to increase from the developing sleeve 1a toward the toner regulating member 6a side.

In order to set a toner regulating region A at the upstream side in the rotational direction of the toner carrier from the opposing position between the developing sleeve 1a and the toner regulating member 6a, the magnetic poles N11 and S61 are arranged at the upstream side in the rotational direction of the toner carrier with respect to the opposing position.

Furthermore, a distance W between the developing sleeve 1a and the toner regulating member 6a is set to fall within a range from 100 $\mu$m to 2 mm, and the ratio between the absolute values of the peripheral velocities of the developing sleeve 1a and the toner regulating member 6a is set to satisfy:

(Absolute value of peripheral velocity of toner regulating member 6a)/(absolute value of peripheral velocity of developing sleeve 1a)>0.5

The magnetic toner has a weight-average particle size of 5 $\mu$m or more, and contains 10% by weight or more of an internally added magnetic member.

In the developing device with the arrangement shown in FIG. 12, since the magnetic flux density becomes higher from the developing sleeve 1a toward the toner regulating member 6a side, a magnetic force from the developing sleeve 1a toward the toner regulating member 6a acts on the magnetic toner present between the developing sleeve 1a and the toner regulating member 6a. Therefore, magnetic toner particles which have a smaller reflection force with the developing sleeve 1a than the magnetic force and are not sufficiently charged are held at the toner regulating member 6a side.

In this embodiment, since the toner regulating member 6a is rotated in the direction of an arrow b in FIG. 12, which is the same as the rotational direction of the developing sleeve 1a, magnetic toner particles, which are insufficiently charged and held on the surface of the toner regulating member 6a by the magnetic force, receive a convey force from the toner regulating member 6a into the developing container 3 on the basis of the force of the magnetic field and a frictional force with the surface of the toner regulating member 6a.

Since the toner regulating region A is set at the upstream side in the rotational direction of the developing sleeve 1a with respect to the opposing position between the developing sleeve 1a and the toner regulating member 6a, insufficiently charged magnetic toner particles can be prevented from being conveyed to the opposing position and passing the opposing position by, e.g., the cohesive force among the magnetic toner particles.

Therefore, insufficiently charged magnetic toner particles are not conveyed to the developing region beyond the opposing position between the developing sleeve 1a and the toner regulating member 6a.

A magnetic toner portion returned into the developing container 3 is scraped from the surface of the toner regulating member 6a by the scraper 5. The magnetic toner portion, which is returned into the developing container 3 in this manner, is stirred with the remaining toner portion by the convey member 4, and is conveyed along the surface of the developing sleeve 1a again to the opposing position between the magnetic poles N11 and S61. The circulating path of the magnetic toner in the developing container 3 in this case is as indicated by an arrow a in FIG. 12.

The magnetic toner is charged by friction with the surface of the developing sleeve 1a in the developing container 3. The charged magnetic toner becomes attached to the surface of the developing sleeve 1a by a reflection force based on the electric charge of the toner itself, and is conveyed to the opposing position between the developing sleeve 1a and the toner regulating member 6a. When the toner is conveyed to the opposing position, insufficiently charged magnetic toner particles are returned from the opposing position between the developing sleeve 1a and the toner regulating member 6a into the developing container 3 for the above-mentioned reason.

Therefore, magnetic toner particles which are conveyed to the developing region via the opposing position between the developing sleeve 1a and the toner regulating member 6a are only sufficiently charged magnetic toner particles, which have acquired a reflection force with the developing sleeve 1a, which exceeds the convey force in the direction toward the interior of the developing container 3.

More specifically, according to the arrangement of this embodiment, a wide latitude in the arrangement for stably coating only a sufficiently charged magnetic toner layer on the surface of the developing sleeve, and conveying the toner to the developing region can be assured.

[Seventh Embodiment]

Figure 13:
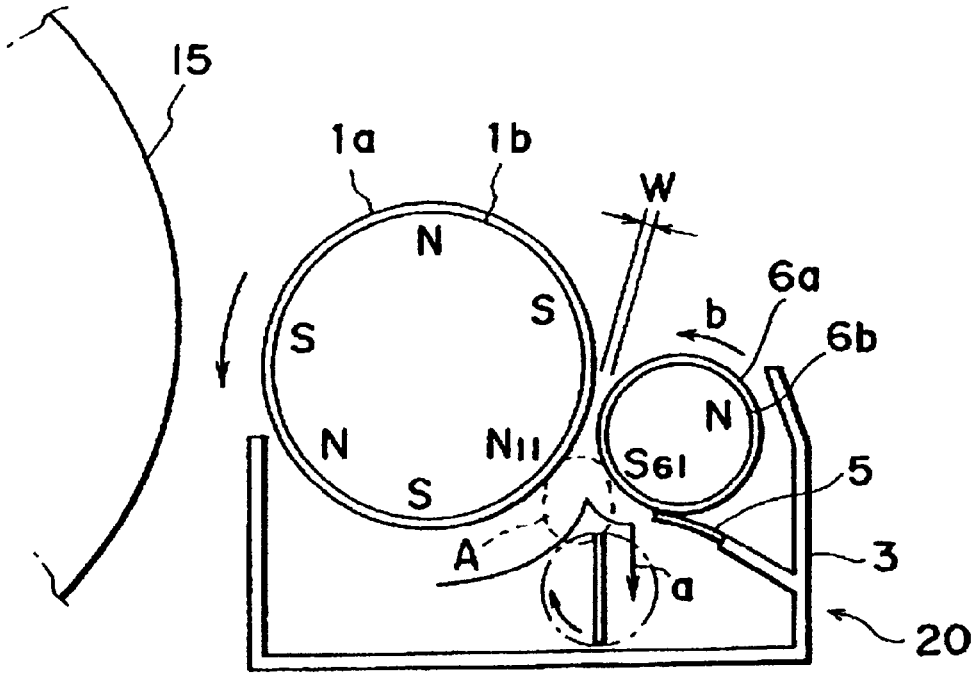
FIG. 13 is a sectional view of a developing device according to a seventh embodiment of the present invention.

Referring to FIG. 13, a developing device 20 has a developing sleeve 1a as a toner carrier, which faces a photosensitive drum 15 as a latent image carrier via the opening portion of a developing container 3, consists of a non-magnetic metal member, and is rotated in the direction of an arrow in FIG. 13. A permanent magnet 1b having a plurality of magnetic poles is fixed in the developing sleeve 1a. Furthermore, a toner regulating member 6a is arranged in the vicinity of the developing sleeve 1a to extend in the same direction as the extending direction of the sleeve 1a. A permanent magnet 6b having a plurality of magnetic poles is fixed in the member 6a. Moreover, a scraper 5, which has one end contacting the toner regulating member 6a, is attached to the developing container 3.

Note that the toner regulating member 6a is arranged to be rotatable in the same direction of an arrow b as the rotational direction of the developing sleeve 1a.

In this embodiment, the magnetic flux density of a magnetic pole S61 in the permanent magnet 6b, which is arranged to be close to and face a magnetic pole N11 in the permanent magnet 1b located at the opposing position between the developing sleeve 1a and the toner regulating member 6a is set to be 800 Gausses, and the magnetic flux density of the magnetic pole N11 is set to be 900 Gausses. Also, the ratio between the 50% values of the magnetic poles is set to satisfy the following relation:

(50% value of magnetic pole S61)/(50% value of magnetic pole N11)≅0.8 and the width of the magnetic pole S61 is set to be smaller than that of the magnetic pole N11, so that the magnetic flux density of a magnetic field formed between the magnetic poles S61 and N11 increases from the developing sleeve 1a toward the toner regulating member 6a side.

In order to set the arrangement position of the toner regulating member 6a in the fourth quadrant (see FIG. 8) on a two-dimensional coordinate plane having the center of the developing sleeve 1a as the center, and to set a toner regulating region A at the upstream side in the rotational direction of the toner carrier from the opposing position between the developing sleeve 1a and the toner regulating member 6a, the magnetic poles N11 and S61 are arranged at the inner side of the developing container 3 with respect to the opposing position.

Furthermore, a distance W between the developing sleeve 1a and the toner regulating member 6a is set to fall within a range from 100 $\mu$m to 2 mm, and the ratio between the absolute values of the peripheral velocities of the developing sleeve 1a and the toner regulating member 6a is set to satisfy:

(Absolute value of peripheral velocity of toner regulating member 6a)/(absolute value of peripheral velocity of developing sleeve 1a)>0.5

The magnetic toner has a weight-average particle size of 5 $\mu$m or more, and contains 10% by weight or more of an internally added magnetic member.

In the developing device with the arrangement shown in FIG. 13, since the magnetic flux density becomes higher from the developing sleeve 1a toward the toner regulating member 6a side, a magnetic force from the developing sleeve 1a toward the toner regulating member 6a acts on the magnetic toner present between the developing sleeve 1a and the toner regulating member 6a. Therefore, magnetic toner particles which have a smaller reflection force with the developing sleeve 1a than the magnetic force and are not sufficiently charged are held at the toner regulating member 6a side.

In this embodiment, since the toner regulating member 6a is rotated in the direction of an arrow b in FIG. 13, which is the same as the rotational direction of the developing sleeve 1a, magnetic toner particles, which are insufficiently charged and held on the surface of the toner regulating member 6a by the magnetic force, receive a convey force from the toner regulating member 6a into the developing container 3 on the basis of the force of the magnetic field and a frictional force with the surface of the toner regulating member 6a.

Since the arrangement position of the toner regulating member 6a is set at the side opposite to the photosensitive drum 15 with respect to a line in the direction of gravity, which passes the center of the developing sleeve 1a, and below a line in the horizontal direction, the direction of a convey force depending on the gravity acting on the magnetic toner is set not to coincide with the direction of the toner amount regulating region A in a convey path of the magnetic toner which is scooped up from the developing sleeve 1a side in the developing container 3 and is returned into the developing container 3 by the toner regulating member 6a. In addition, the toner amount regulating region is set at the upstream side in the rotational direction of the developing sleeve 1a with respect to the opposing position between the developing sleeve 1a and the toner regulating member 6a. For these reasons, insufficiently charged magnetic toner particles can be stably returned from the toner amount regulating region A into the developing container 3, and can be prevented from being conveyed to the opposing position and passing the opposing position by, e.g., the cohesive force among magnetic toner particles.

Therefore, insufficiently charged magnetic toner particles are not conveyed to the developing region beyond the opposing position between the developing sleeve 1a and the toner regulating member 6a.

A magnetic toner portion returned into the developing container 3 is scraped from the surface of the toner regulating member 6a by the scraper 5. The magnetic toner portion, which is returned into the developing container 3 in this manner, is stirred with the remaining toner portion by a convey member 4, and is conveyed along the surface of the developing sleeve 1a again to the opposing position between the magnetic poles N11 and S61. The circulating path of the magnetic toner in the developing container 3 in this case is as indicated by an arrow a in FIG. 13.

The magnetic toner is charged by friction with the surface of the developing sleeve 1a in the developing container 3. The charged magnetic toner becomes attached to the surface of the developing sleeve 1a by a reflection force based on the electric charge of the toner itself, and is conveyed to the opposing position between the developing sleeve 1a and the toner regulating member 6a. When the toner is conveyed to the opposing position, insufficiently charged magnetic toner particles are returned from the opposing position between the developing sleeve 1a and the toner regulating member 6a into the developing container 3 for the above-mentioned reason.

Therefore, magnetic toner particles which are conveyed to the developing region via the opposing position between the developing sleeve 1a and the toner regulating member 6a are only sufficiently charged magnetic toner particles, which have acquired a reflection force with the developing sleeve 1a, which exceeds the convey force in the direction toward the interior of the developing container 3.

More specifically, according to the arrangement of this embodiment, a wide latitude in the arrangement for stably coating only a sufficiently charged magnetic toner layer on the surface of the developing sleeve, and conveying the toner to the developing region can be warranted.

Still other preferred embodiments of the present invention will be described below.

[Eighth Embodiment]

Figure 14:
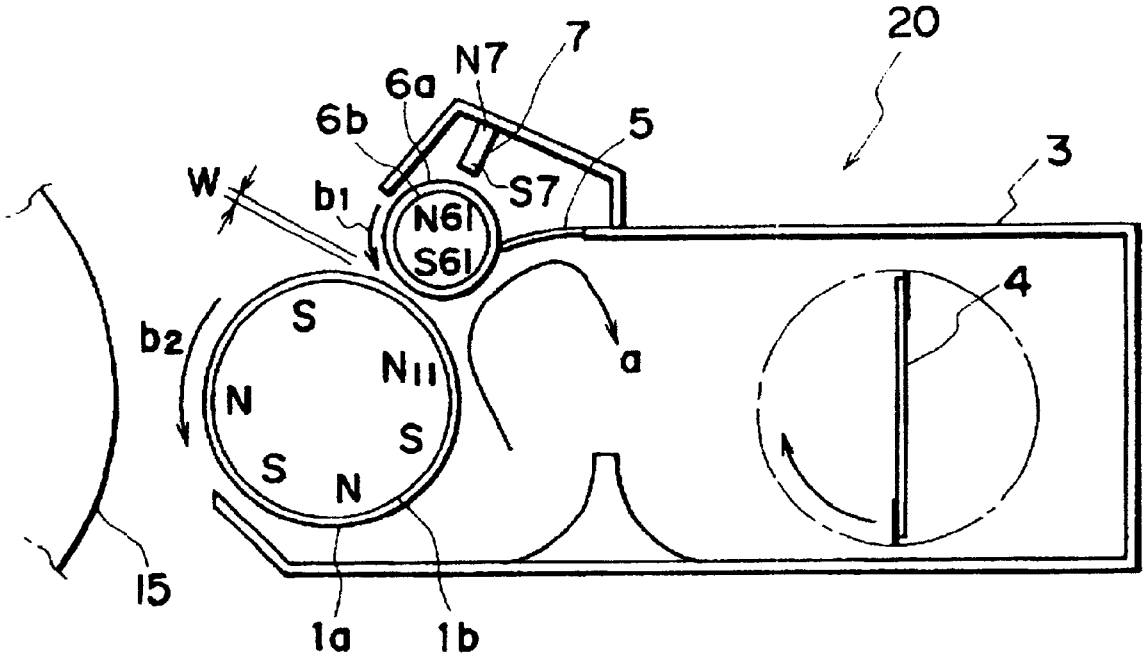
FIG. 14 is a sectional view of a developing device according to an eighth embodiment of the present invention.

Referring to FIG. 14, a developing device 20 has a developing sleeve 1a as a toner carrier, which has a diameter of 32 mm, faces a photosensitive drum 15 as a latent image carrier via the opening portion of a developing container 3, consists of a non-magnetic metal member, and is rotated in the direction of an arrow in FIG. 14. A permanent magnet 1b having a plurality of magnetic poles is fixed in the developing sleeve 1a. A convey member 4 for conveying a toner in the direction of the developing sleeve 1a is arranged in the developing chamber 3 to be rotatable in the direction of an arrow in FIG. 14. Furthermore, a toner regulating member 6a having a diameter of 10 mm is arranged in the vicinity of the developing sleeve 1a to extend in the same direction as the extending direction of the sleeve 1a. A permanent magnet 6b having a plurality of magnetic poles is fixed in the member 6a. Moreover, a scraper 5, which has one end contacting the toner regulating member 6a, is attached to the developing container 3. In addition, a planar permanent magnet 7 having one end facing the toner regulating member 6a is attached to the developing container 3.

The toner regulating member 6a is arranged to be rotatable in the direction of an arrow b1 which is the same as the direction of an arrow b2 as the rotational direction of the developing sleeve 1a.

In this embodiment, the magnetic flux density of a magnetic pole S61 in the permanent magnet 6b, which is arranged to be close to and face a magnetic pole N11 in the permanent magnet 1b located at the opposing position between the developing sleeve 1a and the toner regulating member 6a is set to be 800 Gausses, and the magnetic flux density of the magnetic pole N11 is set to be 900 Gausses. Also, the ratio between the widths (to be referred to as 50% values hereinafter for the sake of simplicity) of regions indicating values of 50% or higher with respect to the peak values of the magnetic flux densities of the magnetic poles is set to satisfy the following relation:

$$\{(50\% \text{ value of magnetic pole } \mathbf{S61})\times(\text{diameter of developing sleeve } \mathbf{1a})\}/\{(50\% \text{ value of magnetic pole } \mathbf{N11})\times(\text{diameter of toner regulating member } \mathbf{6a})\}<1.0$$

The magnetic flux density of a magnetic field formed between the magnetic poles S61 and N11 increases from the developing sleeve 1a toward the toner regulating member 6a side.

Furthermore, a distance W between the developing sleeve 1a and the toner regulating member 6a is set to fall within a range from 100 $\mu$m to 2 mm, and the ratio between the absolute values of the peripheral velocities of the developing sleeve 1a and the toner regulating member 6a is set to satisfy:

$$(\text{Absolute value of peripheral velocity of toner regulating member } \mathbf{6a})/(\text{absolute value of peripheral velocity of developing sleeve } \mathbf{1a})>0.5$$

The planar permanent magnet 7 has a magnetic pole S7 facing a magnetic pole N61 in the permanent magnet 6b, and a magnetic pole N7. The magnetic pole S7 is set to be 800 Gausses, and the magnetic pole N61 is also set to be 800 Gausses.

The magnetic toner has a weight-average particle size of 5 $\mu$m or more, and contains 10% by weight or more of an internally added magnetic member.

In the developing device with the arrangement shown in FIG. 14, since the magnetic flux density becomes higher from the developing sleeve 1a toward the toner regulating member 6a side, a magnetic force from the developing sleeve 1a toward the toner regulating member 6a acts on the magnetic toner present between the developing sleeve 1a and the toner regulating member 6a. Therefore, magnetic toner particles which have a smaller reflection force with the developing sleeve 1a than the magnetic force and are not sufficiently charged are held at the toner regulating member 6a side.

In this embodiment, since the toner regulating member 6a is rotated in the direction of an arrow b1 in FIG. 14, which is the same as the rotational direction of the developing sleeve 1a, magnetic toner particles, which are insufficiently charged and held on the surface of the toner regulating member 6a by the magnetic force, receive a convey force from the toner regulating member 6a into the developing container 3 on the basis of the force of the magnetic field and a frictional force with the surface of the toner regulating member 6a.

In this embodiment, in order to prevent the toner regulating member 6a from being flexed by the magnetic force from the permanent magnet 1b, the magnetic pole S7 of the permanent magnet 7 is arranged on the position facing the magnetic pole N61 of the permanent magnet 6b in the toner regulating member 6a, and applies a magnetic force from the magnetic pole S7 in a direction opposite to that of the magnetic force from the above-mentioned permanent magnet 1b, thereby preventing the toner regulating member 6a from being flexed. As a result, a toner coating nonuniformity caused by flexure of the toner regulating member 6a can be prevented.

Therefore, insufficiently charged magnetic toner particles are not conveyed to the developing region beyond the opposing position between the developing sleeve 1a and the toner regulating member 6a.

A magnetic toner portion returned into the developing container 3 is scraped from the surface of the toner regulating member 6a by the scraper 5. The magnetic toner portion, which is returned into the developing container 3 in this manner, is attracted on the surface of the developing sleeve 1a by the magnetic force, and is conveyed to the opposing position between the magnetic poles N11 and S61. The circulating path of the magnetic toner in the developing container 3 in this case is as indicated by an arrow a in FIG. 14.

The magnetic toner is conveyed to the opposing position between the developing sleeve 1a and the toner regulating member 6a along the surface of the developing sleeve 1a by the magnetic force in the developing container 3. When the toner is conveyed to the opposing position, insufficiently charged magnetic toner particles are returned from the opposing position between the developing sleeve 1a and the toner regulating member 6a into the developing container 3 for the above-mentioned reason.

Therefore, magnetic toner particles which are conveyed to the developing region via the opposing position between the developing sleeve 1a and the toner regulating member 6a are only sufficiently charged magnetic toner particles, which have acquired a reflection force with the developing sleeve 1a, which exceeds the convey force in the direction to the interior of the developing container 3.

More specifically, according to the arrangement of this embodiment, a toner coating nonuniformity caused by flexure of the toner regulating member 6a can be eliminated.

[Ninth Embodiment]

Figure 15:
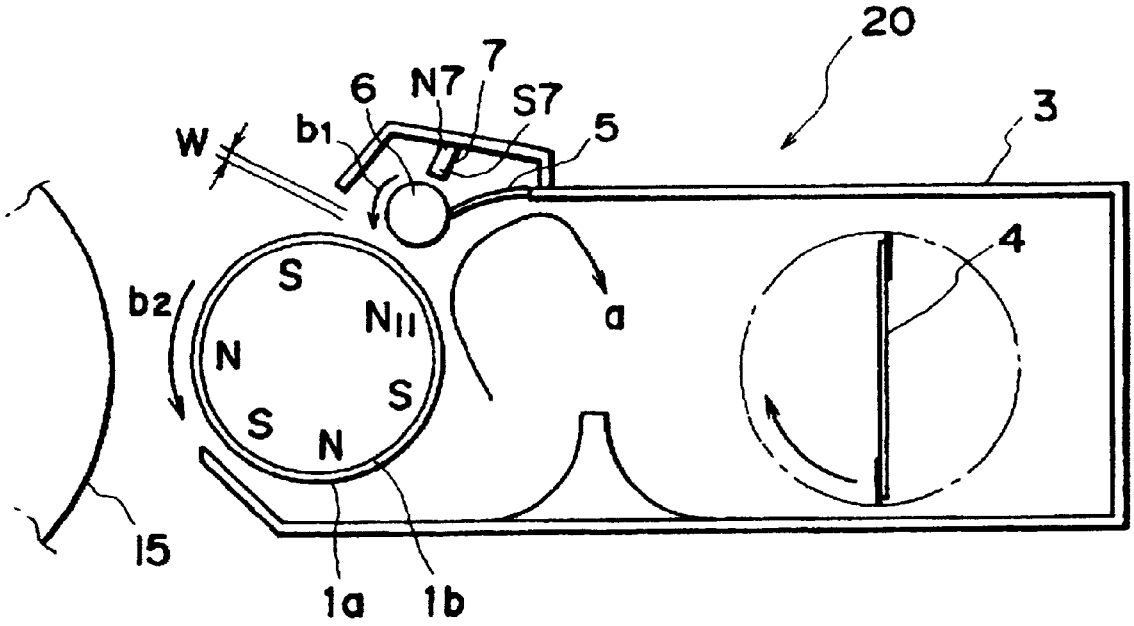
FIG. 15 is a sectional view of a developing device according to a ninth embodiment of the present invention.

Referring to FIG. 15, a developing device 20 has a developing sleeve 1a as a toner carrier, which has a diameter of 32 mm, faces a photosensitive drum 15 as a latent image carrier via the opening portion of a developing container 3, consists of a non-magnetic metal member, and is rotated in the direction of an arrow in FIG. 15. A permanent magnet 1b having a plurality of magnetic poles is fixed in the developing sleeve 1a. A convey member 4 for conveying a toner in the direction of the developing sleeve 1a is arranged in the developing chamber 3 to be rotatable in the direction of an arrow in FIG. 15. Furthermore, a toner regulating member 6 having a diameter of 8 mm is arranged in the vicinity of the developing sleeve 1a to extend in the same direction as the extending direction of the sleeve 1a, and a scraper 5 is attached to the developing container 3 to have one end contacting the toner regulating member 6. In addition, a planar permanent magnet 7 having one end facing the toner regulating member 6 is attached to the developing container 3.

The toner regulating member 6 is arranged to be rotatable in the direction of an arrow b1 which is the same as the direction of an arrow b2 as the rotational direction of the developing sleeve 1a.

In this embodiment, the magnetic flux density of a magnetic pole N11 in the developing sleeve 1a is set to be 900 Gausses, and the 50% value of the magnetic pole N11 is set to fall within a range from 40° to 60°, and the width of the toner regulating member 6 is set to be smaller than that of the magnetic pole N11. With this arrangement, the magnetic flux density of a magnetic field formed between the toner regulating member 6 and the magnetic pole N11 increases from the developing sleeve 1 toward the toner regulating member 6 side.

Furthermore, a distance W between the developing sleeve 1a and the toner regulating member 6 is set to fall within a range from 100 $\mu$m to 2 mm, and the ratio between the absolute values of the peripheral velocities of the developing sleeve 1a and the toner regulating member 6 is set to satisfy:

(Absolute value of peripheral velocity of toner regulating member 6)/(absolute value of peripheral velocity of developing sleeve 1a)>0.5

The planar permanent magnet 7 is arranged at the side opposite to the magnetic pole N11 to sandwich the toner regulating member 6 therebetween on a line passing the centers of the developing sleeve 1a the toner regulating member 6, and its magnetic pole S7 is set to be 1,000 Gausses.

The magnetic toner has a weight-average particle size of 5 $\mu$m or more, and contains 10% by weight or more of an internally added magnetic member.

In the developing device with the arrangement shown in FIG. 15, since the magnetic flux density becomes higher from the developing sleeve 1a toward the toner regulating member 6 side, a magnetic force from the developing sleeve 1a toward the toner regulating member 6 acts on the magnetic toner present between the developing sleeve 1a and the toner regulating member 6. Therefore, magnetic toner particles which have a smaller reflection force with the developing sleeve 1a than the magnetic force and are not sufficiently charged are held at the toner regulating member 6 side.

In this embodiment, since the toner regulating member 6 is rotated in the direction of the arrow b1 in FIG. 15, which is the same as the rotational direction of the developing sleeve 1a, magnetic toner particles, which are insufficiently charged and held on the surface of the toner regulating member 6 by the magnetic force, receive a convey force from the toner regulating member 6 into the developing container 3 on the basis of the force of the magnetic field and a frictional force with the surface of the toner regulating member 6.

In this embodiment, in order to prevent flexure of the toner regulating member 6 by the magnetic force from the permanent magnet 1b, the magnetic pole S7 of the permanent magnet 7 is arranged at the position facing the toner regulating member 6, and applies a magnetic force from the magnetic pole S7 in a direction opposite to that of the magnetic force from the above-mentioned permanent magnet 1b.

As a result, a toner coating nonuniformity caused by flexure of the toner regulating member 6 can be prevented.

Therefore, insufficiently charged magnetic toner particles are not conveyed to the developing region beyond the opposing position between the developing sleeve 1a and the toner regulating member 6.

A magnetic toner portion returned into the developing container 3 is scraped from the surface of the toner regulating member 6 by the scraper 5. The magnetic toner portion, which is returned into the developing container 3 in this manner, is stirred with the remaining toner portion by the convey member 4, and is conveyed along the surface of the developing sleeve 1a again to the opposing position between the magnetic poles N11 and S61. The circulating path of the magnetic toner in the developing container 3 in this case is as indicated by an arrow a in FIG. 15.

The magnetic toner is charged by friction with the surface of the developing sleeve 1a in the developing container 3. The charged magnetic toner becomes attached to the surface of the developing sleeve 1a by a reflection force based on the electric charge of the toner itself, and is conveyed to the opposing position between the developing sleeve 1a and the toner regulating member 6. When the toner is conveyed to the opposing position, insufficiently charged magnetic toner particles are returned from the opposing position between the developing sleeve 1a and the toner regulating member 6 into the developing container 3 for the above-mentioned reason.

Therefore, magnetic toner particles which are conveyed to the developing region via the opposing position between the developing sleeve 1a and the toner regulating member 6 are only sufficiently charged magnetic toner particles, which have acquired a reflection force with the developing sleeve 1a, which exceeds the convey force in the direction toward the interior of the developing container 3.

More specifically, according to the arrangement of this embodiment, a toner coating nonuniformity caused by flexure of the toner regulating member 6 can be eliminated.

[10th Embodiment]

Figure 16:
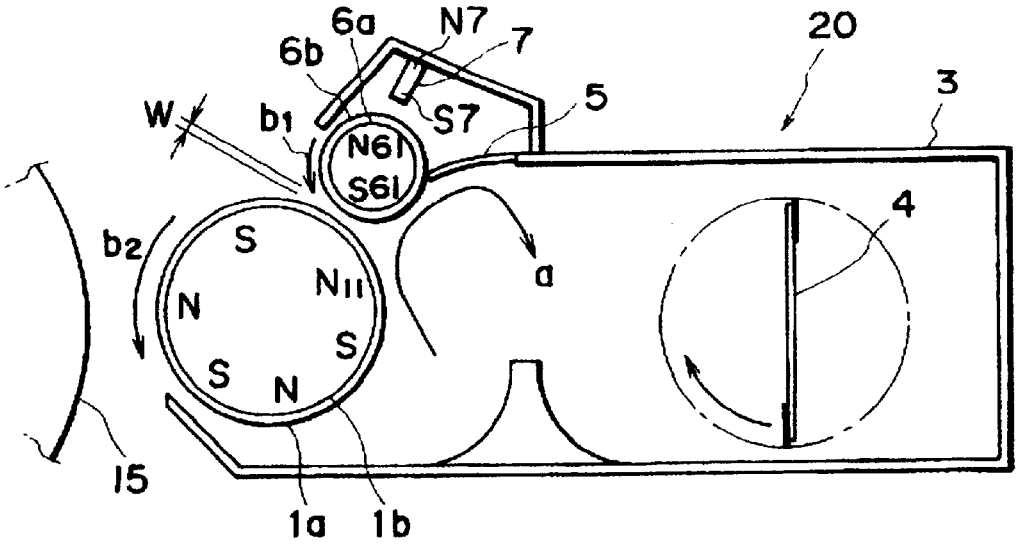
FIG. 16 is a sectional view of a developing device according to a tenth embodiment of the present invention.

Referring to FIG. 16, a developing device 20 has a developing sleeve 1a as a toner carrier, which has a diameter of 32 mm, faces a photosensitive drum 15 as a latent image carrier via the opening portion of a developing container 3, consists of a non-magnetic metal member, and is rotated in the direction of an arrow in FIG. 16. A permanent magnet 1b having a plurality of magnetic poles is fixed in the developing sleeve 1a. A convey member 4 for conveying a toner in the direction of the developing sleeve 1a is arranged in the developing chamber 3 to be rotatable in the direction of an arrow in FIG. 16. Furthermore, a toner regulating member 6a having a diameter of 10 mm is arranged in the vicinity of the developing sleeve 1a to extend in the same direction as the extending direction of the sleeve 1a. A permanent magnet 6b having a plurality of magnetic poles is fixed in the member 6a. Moreover, a scraper 5, which has one end contacting the toner regulating member 6a, is attached to the developing container 3. In addition, a planar permanent magnet 7 having one end facing the toner regulating member 6a is attached to the developing container 3.

The toner regulating member 6a is arranged to be rotatable in the direction of an arrow b1 which is the same as the direction of an arrow b2 as the rotational direction of the developing sleeve 1a.

In this embodiment, the magnetic flux density of a magnetic pole S61 in the permanent magnet 6b, which is arranged to be close to and face a magnetic pole N11 in the permanent magnet 1b located at the opposing position between the developing sleeve 1a and the toner regulating member 6a is set to be 800 Gausses, and the magnetic flux density of the magnetic pole N11 is set to be 900 Gausses. Also, the ratio between the 50% values of the magnetic poles is set to satisfy the following relation:

{(50% value of magnetic pole S61)×(diameter of developing sleeve 1a)}/{(50% value of magnetic pole N11)×(diameter of toner regulating member 6a)}<1.0 and the width of the magnetic pole S61 is set to be smaller than that of the magnetic pole N11, so that the magnetic flux density of a magnetic field formed between the magnetic poles S61 and N11 increases from the developing sleeve 1a toward the toner regulating member 6a side.

Furthermore, a distance W between the developing sleeve 1a and the toner regulating member 6a is set to fall within a range from 100 μm to 2 mm, and the ratio between the absolute values of the peripheral velocities of the developing sleeve 1a and the toner regulating member 6a [*is set to satisfy:*] is set to satisfy:

(Absolute value of peripheral velocity of toner regulating member 6a)/(absolute value of peripheral velocity of developing sleeve 1a)>0.5

Figure 17:
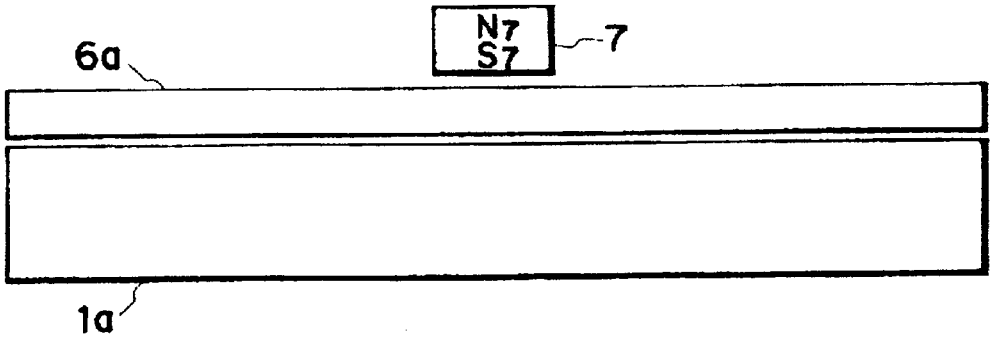
FIG. 17 is a view showing the relationship among a sleeve, a regulating member, and a magnet in the embodiment shown in FIG. 16.

In the planar permanent magnet 7, a magnetic pole S7 is arranged within a width of ±2 cm at the central portion, in the longitudinal direction, of the toner regulating member 6a to face a magnetic pole N61 in the permanent magnet 6b, as shown in FIG. 17. The magnetic pole N61 is set to be 800 Gausses, and the magnetic pole S7 is set to be 800 Gausses.

The magnetic toner has a weight-average particle size of 5 μm or more, and contains 10% by weight or more of an internally added magnetic member.

In the developing device with the arrangement shown in FIG. 16, since the magnetic flux density becomes higher from the developing sleeve 1a toward the toner regulating member 6a side, a magnetic force from the developing sleeve 1a toward the toner regulating member 6a acts on the magnetic toner present between the developing sleeve 1a and the toner regulating member 6a. Therefore, magnetic toner particles which have a smaller reflection force with the developing sleeve 1a than the magnetic force and are not sufficiently charged are held at the toner regulating member 6a side.

In this embodiment, since the toner regulating member 6a is rotated in the direction of the arrow b1 in FIG. 16, which is the same as the rotational direction of the developing sleeve 1a, magnetic toner particles, which are insufficiently charged and held on the surface of the toner regulating member 6a by the magnetic force, receive a convey force from the toner regulating member 6a into the developing container 3 on the basis of the force of the magnetic field and a frictional force with the surface of the toner regulating member 6a.

In this embodiment, in order to prevent the toner regulating member 6a from being flexed by the magnetic force from the permanent magnet 1b, the following arrangement is adopted.

Since a flexure caused by the magnetic force from the permanent magnet 1b becomes largest at the central portion of the toner regulating member 6a, the magnetic pole S7 of the permanent magnet 7 is arranged to face the magnetic pole N61 of the permanent magnet 6b in the toner regulating member 6a within the width of ±2 cm at the central portion, in the longitudinal direction, of the toner regulating member 6a, and a magnetic force from the magnetic pole S7 is applied to the central portion of the toner regulating member 6a in a direction opposite to that of the magnetic force from the above-mentioned permanent magnet 1b, thereby preventing the flexure of the toner regulating member 6a. As a result, a toner coating nonuniformity caused by the flexure of the toner regulating member 6a can be prevented.

Therefore, insufficiently charged magnetic toner particles are not conveyed to the developing region beyond the opposing position between the developing sleeve 1a and the toner regulating member 6a.

A magnetic toner portion returned into the developing container 3 is scraped from the surface of the toner regulating member 6a by the scraper 5. The magnetic toner portion, which is returned into the developing container 3 in this manner, is attracted on the surface of the developing sleeve 1a by the magnetic force, and is conveyed to the opposing position between the magnetic poles N11 and S61. The circulating path of the magnetic toner in the developing container 3 in this case is as indicated by an arrow a in FIG. 16.

The magnetic toner is charged by friction with the surface of the developing sleeve 1a in the developing container 3. The charged magnetic toner becomes attached to the surface of the developing sleeve 1a by a reflection force based on the electric charge of the toner itself, and is conveyed to the opposing position between the developing sleeve 1a and the toner regulating member 6a. When the toner is conveyed to the opposing position, insufficiently charged magnetic toner particles are returned from the opposing position between the developing sleeve 1a and the toner regulating member 6a into the developing container 3 for the above-mentioned reason.

Therefore, magnetic toner particles which are conveyed to the developing region via the opposing position between the developing sleeve 1a and the toner regulating member 6a are only sufficiently charged magnetic toner particles, which have acquired a reflection force with the developing sleeve 1a, which exceeds the convey force in the direction toward the interior of the developing container 3.

More specifically, according to the arrangement of this embodiment, a toner coating nonuniformity caused by flexure of the toner regulating member 6a can be eliminated.

[11th Embodiment]

Figure 18:
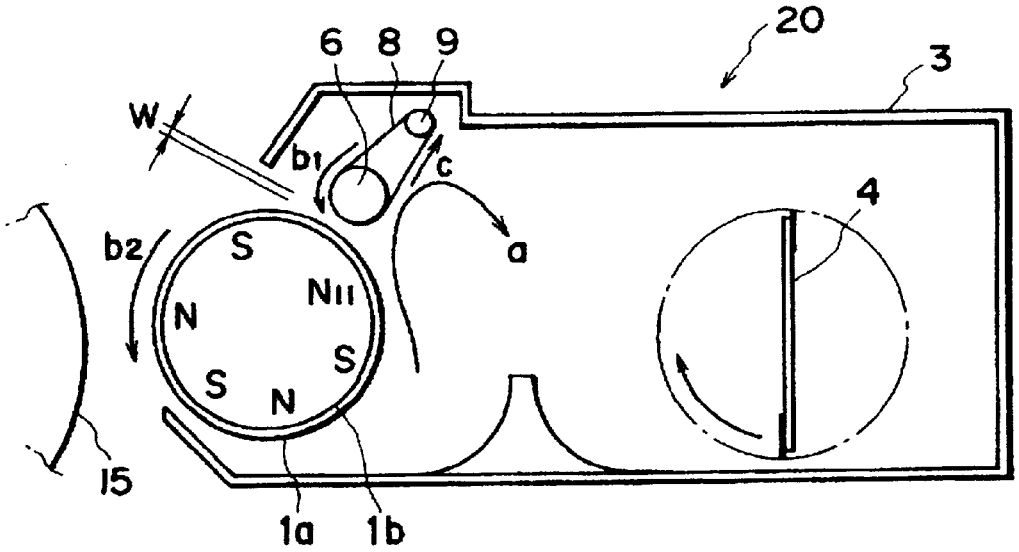
FIG. 18 is a sectional view of a developing device according to an eleventh embodiment of the present invention.

Referring to FIG. 18, a developing device 20 has a developing sleeve 1a as a toner carrier which faces a photosensitive drum 15 as a latent image carrier via the opening portion of a developing container 3, consists of a non-magnetic metal member, and is rotated in the direction of an arrow in FIG. 18. A permanent magnet 1b having a plurality of magnetic poles is fixed in the developing sleeve 1a. A convey member for conveying a toner in the direction of the developing sleeve 1a is arranged in the developing chamber 3 to be rotatable in the direction of an arrow in FIG. 18. Furthermore, a toner regulating member 6 having a diameter of 8 mm is arranged in the vicinity of the developing sleeve 1a to extend in the same direction as the extending direction of the sleeve 1a.

A roller 9 is arranged adjacent to the toner regulating member 6, and a film 8 is looped between the roller 9 and the toner regulating member 6.

Note that the toner regulating member 6 is arranged to be rotatable in the direction of an arrow b1 which is the same as the direction of an arrow b2 as the rotational direction of the developing sleeve 1a.

In this embodiment, the magnetic flux density of a magnetic pole N11 in the developing sleeve 1a is set to be 1,000 Gausses, and the 50% value of the magnetic pole N11 is set to fall within a range from 40° to 60°, and the width of the toner regulating member 6 is set to be smaller than that of the magnetic pole N11. With this arrangement, the magnetic flux density of a magnetic field formed between the toner regulating member 6 and the magnetic pole N11 increases from the developing sleeve 1a toward the toner regulating member 6 side.

Furthermore, a distance W between the developing sleeve 1a and the toner regulating member 6 is set to fall within a range from 100 μm to 2 mm, and the ratio between the absolute values of the peripheral velocities of the developing sleeve 1a and the toner regulating member 6 is set to satisfy:

(Absolute value of peripheral velocity of toner regulating member 6)/(absolute value of peripheral velocity of developing sleeve 1a)>0.5

The film 8 comprises a 100-μm thick [capton] film, and is rotated in the direction of an arrow c upon rotation of the toner regulating member 6 in the direction of the arrow b1.

The magnetic toner has a weight-average particle size of 5 μm or more, and contains 10% by weight or more of an internally added magnetic member.

In the developing device with the arrangement shown in FIG. 16, since the magnetic flux density becomes higher from the developing sleeve 1a toward the toner regulating member 6 side, a magnetic force from the developing sleeve 1a toward the toner regulating member 6 acts on the magnetic toner present between the developing sleeve 1a and the toner regulating member 6. Therefore, magnetic toner particles which have a smaller reflection force with the developing sleeve 1a than the magnetic force and are not sufficiently charged are held at the toner regulating member 6 side.

In this embodiment, since the film 8 is rotated in the direction of the arrow c in FIG. 18, which is the same as the rotational direction of the developing sleeve 1a, magnetic toner particles, which are insufficiently charged and held on the surface of the toner regulating member 6 by the magnetic force, receive a convey force from the toner regulating member 6 into the developing container 3 on the basis of the force of the magnetic field and a frictional force with the surface of the toner regulating member 6.

In this embodiment, in order to prevent flexure of the toner regulating member 6 by the magnetic force from the permanent magnet 1b, the toner regulating member 6 is pulled by the film 8 in a direction opposite to the direction of the magnetic force from the permanent magnet 1b. As a result, a toner coating nonuniformity caused by the flexure of the toner regulating member 6 can be prevented.

Therefore, insufficiently charged magnetic toner particles are not conveyed to the developing region beyond the opposing position between the developing sleeve 1a and the toner regulating member 6.

When a restriction force of the magnetic force disappears, the magnetic toner returned into the developing container 3 drops from the surface of the film 8 by its own weight.

A magnetic toner portion, which is returned into the developing container 3 in this manner, is attracted on the surface of the developing sleeve 1a by the magnetic force, and is conveyed to the opposing position between the magnetic pole N11 and the toner regulating member 6. The circulating path of the magnetic toner in the developing container 3 in this case is as indicated by an arrow a in FIG. 18.

The magnetic toner is charged by friction with the surface of the developing sleeve 1a in the developing container 3. The charged magnetic toner becomes attached to the surface of the developing sleeve 1a by a reflection force based on the electric charge of the toner itself, and is conveyed to the opposing position between the developing sleeve 1a and the toner regulating member 6. When the toner is conveyed to the opposing position, insufficiently charged magnetic toner particles are returned from the opposing position between the developing sleeve 1a and the toner regulating member 6 into the developing container 3 for the above-mentioned reason.

Therefore, magnetic toner particles which are conveyed to the developing region via the opposing position between the developing sleeve 1a and the toner regulating member 6 are only sufficiently charged magnetic toner particles, which have acquired a reflection force with the developing sleeve 1a, which exceeds the convey force in the direction to the interior of the developing container 3.

More specifically, according to the arrangement of this embodiment, a toner coating nonuniformity caused by flexure of the toner regulating member 6 can be eliminated.

The embodiments of the present invention have been exemplified. However, the present invention is not limited to these embodiments, and various modifications may be made within the spirit and scope of the invention.

What is claimed is:

1. A developing device comprising:

a toner carrier, having a magnet therein, for carrying a magnetic toner;

a regulating rotary member, having a magnet therein, for regulating an amount of toner on said toner carrier, said regulating rotary member being provided to be spaced apart from the surface of said toner carrier by a predetermined distance; and magnetic field generating means for applying a magnetic force to said regulating rotary member from a side of said regulating rotary member opposite said toner carrier, said magnetic field generating means applying the magnetic force in a direction substantially opposite to a direction of a magnetic force received by said regulating rotary member from the magnet in said toner carrier.

2. A device according to claim 1, wherein said magnetic field generating means comprises a magnet which is arranged at a substantially central portion, in an axial direction, of said regulating rotary member.

3. A device according to claim 1, wherein a magnetic flux density of the magnetic force applied by said magnetic field generating means increases in a direction from said toner carrier toward said regulating rotary member.

4. A device according to claim 1, wherein, in a regulating portion of said regulating rotary member, a rotational direction of said regulating rotary member is opposite to a moving direction of said toner carrier.

* * * * *

UNITED STATES PATENT AND TRADEMARK OFFICE

CERTIFICATE OF CORRECTION

PATENT NO. : RE 38,026 E
DATED : March 11, 2003
INVENTOR(S) : Tatsuya Tada et al.

It is certified that error appears in the above-identified patent and that said Letters Patent is hereby corrected as shown below:

Column 13,
Line 24, “warranted.” should read -- obtained. --.

Signed and Sealed this

Thirtieth Day of December, 2003

JAMES E. ROGAN
*Director of the United States Patent and Trademark Office*